United States Patent [19]

Kaufman et al.

[11] 4,025,903
[45] May 24, 1977

[54] AUTOMATIC MODULAR MEMORY ADDRESS ALLOCATION SYSTEM

[75] Inventors: Phillip A. Kaufman, Irvine; Kenneth C. Gorman; George C. Henry, both of Mission Viejo; Roy Blacksher, Santa Ana, all of Calif.

[73] Assignee: Computer Automation, Inc., Irvine, Calif.

[22] Filed: Sept. 10, 1973

[21] Appl. No.: 395,548

[52] U.S. Cl. .......................................... 340/172.5
[51] Int. Cl.[2] ................. G06F 13/06; G11C 5/06; G11C 7/00; G11C 9/00
[58] Field of Search .................. 340/172.5; 444/1; 445/1

[56] References Cited

UNITED STATES PATENTS

| | | | |
|---|---|---|---|
| 3,328,768 | 6/1967 | Amdahl et al. | 340/172.5 |
| 3,389,380 | 6/1968 | Ashbaugh et al. | 340/172.5 |
| 3,411,139 | 11/1968 | Lynch et al. | 340/172.5 |
| 3,413,613 | 11/1968 | Bahrs et al. | 340/172.5 |
| 3,553,653 | 1/1971 | Krock | 340/172.5 |
| 3,560,935 | 2/1971 | Beers | 340/172.5 |
| 3,573,855 | 4/1971 | Cragon et al. | 340/172.5 |
| 3,576,544 | 4/1971 | Cordero et al. | 340/172.5 |
| 3,585,605 | 6/1971 | Gardner et al. | 340/172.5 |
| 3,701,977 | 10/1972 | Mendelson et al. | 340/172.5 |
| 3,725,874 | 4/1973 | Van Heel | 340/172.5 |
| 3,742,458 | 6/1973 | Inoue et al. | 340/172.5 |
| 3,781,812 | 12/1973 | Wymore et al. | 340/172.5 |
| 3,787,813 | 1/1974 | Cole et al. | 340/172.5 |
| 3,793,631 | 2/1974 | Silverstein | 340/172.5 |
| 3,803,562 | 4/1974 | Hunter | 340/173 BB |
| 3,815,103 | 6/1974 | Holtey et al. | 340/172.5 |
| 3,818,460 | 6/1974 | Beard et al. | 340/172.5 |
| 3,840,864 | 10/1974 | Chang et al. | 340/172.5 |
| 3,889,243 | 6/1975 | Drimak | 340/172.5 |

FOREIGN PATENTS OR APPLICATIONS

| | | |
|---|---|---|
| 1,116,869 | 6/1968 | United Kingdom |
| 1,200,564 | 7/1970 | United Kingdom |
| 1,221,640 | 2/1971 | United Kingdom |
| 1,288,728 | 9/1972 | United Kingdom |

*Primary Examiner*—Gareth D. Shaw
*Assistant Examiner*—Jan E. Rhoads
*Attorney, Agent, or Firm*—Reed C. Lawlor

[57] ABSTRACT

A modular minicomputer is provided which is assembled from a central processor unit module and a plurality of memory modules. Small calculators on the memory modules are so interlocked that when the computer is powered up, memory address boundaries are calculated automatically. As a result, the bank of memory modules appears to the central processing unit the same as a single large memory unit.

43 Claims, 10 Drawing Figures

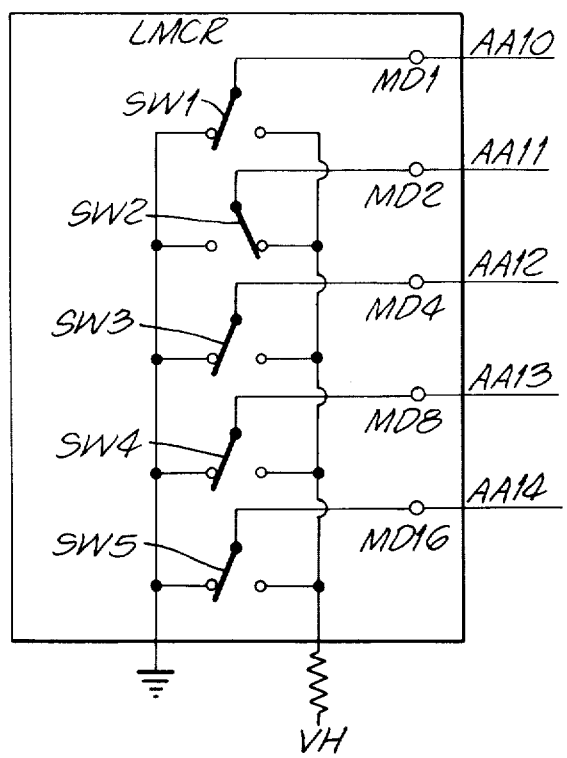
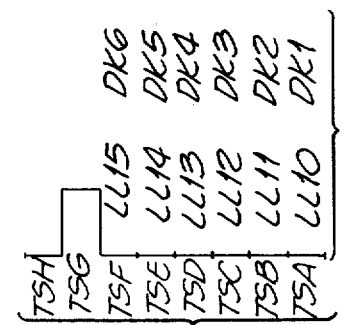
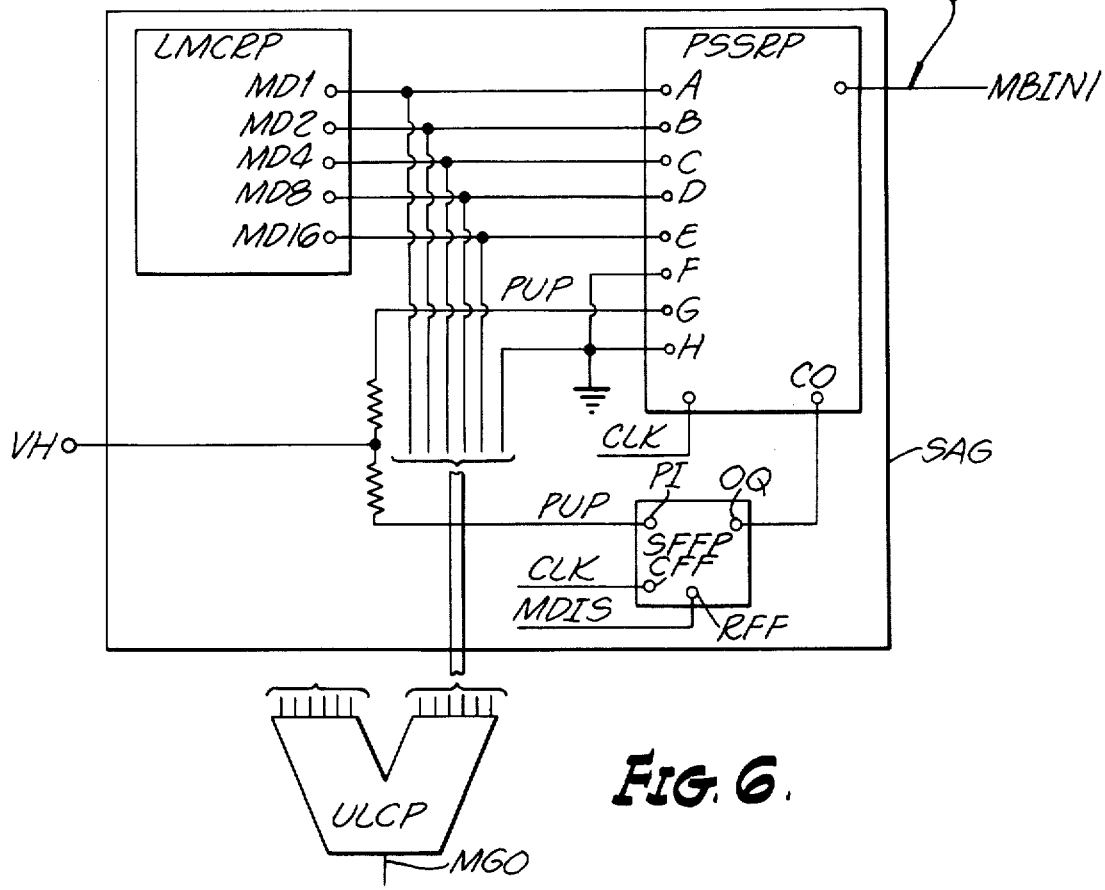
FIG. 5.
FIG. 6.

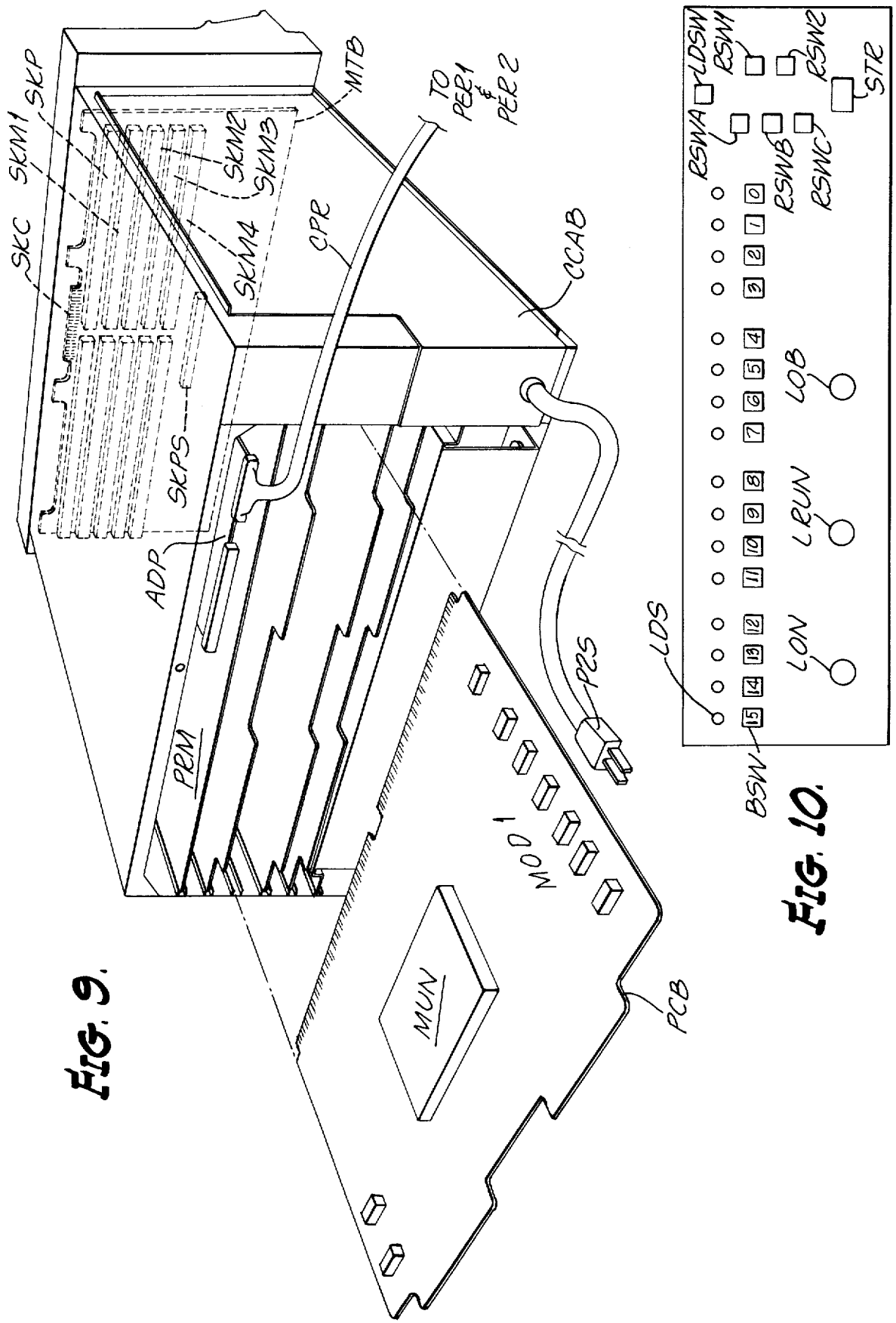

AUTOMATIC MODULAR MEMORY ADDRESS ALLOCATION SYSTEM

INTRODUCTION

This invention relates to improved memory systems for modular minicomputers, and more particularly to minicomputers with expandable, flexible memory systems composed of a plurality of memory modules.

As the term is commonly employed, a minicomputer is a general purpose programmable digital computer having a relatively small memory capacity, a processing unit and one or more input/output devices, and a control console.

A modular minicomputer of the type to which this invention particularly applies includes a cabinet or housing with a plurality of plug-in connections into which computer plug-in modules may be plugged in order to complete an operable general purpose programmable computer of arbitrary capacity up to a small limit of, say, 32K words. Such computers may also be expandable for arranging a plurality of banks of 32K words each in order to increase the capacity of the computer.

Though the invention is capable of use in computers that are of large capacity, it will be described herein as embodied in a computer having a maximum capacity of 32K words of 16 bits each. Furthermore, the invention will be described with reference to a modular minicomputer of the plug-in type, even though in some of its aspects the invention may be applied to computers which are not of the plug-in type but which requires that modules be wired permanently in place.

The limitation of the minicomputer to a capacity of 32K or some other designated amount, depends largely upon the design of the processor. For the purpose of illustrating the present invention, it will be assumed that the processor is capable of addressing a bank of memory modules having a total capacity of 32K words or less. As used herein, the term "compound memory system," is synonymous with "bank of memory modules."

Various types of modules of the plug-in type are employed in such a minicomputer. Typically, the modules are in the form of printed circuit boards which have various electronic components mounted upon them, including integrated-circuit chips which are also of the plug-in type, and which are plugged into appropriate terminals on the printed circuit boards, and then interconnected with each other and to various electronic components that are likewise mounted on such boards.

Typically, control components, arithmetic processors, decoders and various registers, a master timer, and timing circuits, are mounted on a processor board thereby forming a central processor module. A small memory unit may also be mounted on the processor board.

In the minicomputer of the type to which this invention is particularly applicable, a plurality of memory modules are provided. Each of these memory modules consists of a plug-in printed circuit board which carries an addressable memory unit, local memory processors where needed, and cell selectors that enables the central processor to address only a selected memory cell of a memory unit at any one time. Such a memory processor controls the elements of the memory unit and times the control actions.

A power supply module is also provided with a regulated power supply for converting alternating current of a power frequency, such as 60Hz, into DC potentials of values suitable for energizing various components on the other modules.

Also, generally, a module in the form of a printed circuit board with female connectors, known as a mother board, is employed for providing for interconnection of the other of the various modules of the computer.

A minicomputer generally includes one or more interface units for interfacing with peripheral units, for example, input devices, such as punched tape readers or output devices, such as typewriters or oscilloscopes. One of the interface units is generally arranged to interface with the controls on the console. Other interface units may be mounted on other plug-in boards, which may or may not also carry suitable memory units, that facilitate interfacing with other peripheral units. Such peripheral devices are sometimes referred to as I/O devices.

The modular construction of the class of minicomputers to which this invention is particularly applicable, provides a flexible system in which various peripheral units and various memory modules having addressable memory units of different individual, or local, memory capacities, may be plugged into the plug-in connectors, or sockets, in order to provide a minicomputer that meets special requirements of different customers. Some memory modules may be employed which have a long access time or a long cycle time, or both, and which are relatively inexpensive. Other memory modules may be employed which have a short access time or a short cycle time, or both, and which are relatively expensive. For example, where a minicomputer is thus assembled from the modules to provide for rapid, voluminous, I/O operation, an expensive module may be required of low local memory capacity. Some aspects of the invention are applicable even though all the memory modules employ memory units of the same capacity.

Where a module carries an addressable memory unit, it will be referred to as a memory module, regardless of whether or not it also includes an I/O interface. Where no I/O interface is present in a memory module, the module will sometimes be called a pure memory module.

In practice, each memory unit includes a plurality of memory cells which are arranged in a rectangular array, together with suitable means for addressing individual cells in the array. Generally speaking, memory cells are of two types, the R/W (read-write) type, and the ROM (read-only memory) type. The cells in both types may be addressed in the same way and information may be read out of such cells as required, in a conventional manner. In an R/W memory, information may also be written into the cells. Each cell consists of a plurality of memory elements, such as magnetic cores, in each of which a single bit of information may be stored. By way of example a 16-bit memory cell of a magnetic memory unit has 16 cores in it for storing 16 bits of information. The sixteen bits of information typically represents a program instruction, an address to be utilized in carrying out an instruction, or they may represent numerical or other data to be used in processing.

In the case of a memory unit of the R/W type, means are provided for rewriting information in the memory cell immediately after that information is read out of the memory cell so that that information is not destroyed, but is available for being repeatedly read out of the memory cell. In the case of an ROM memory unit, the information is not destroyed when it is read out, but is retained permanently.

Where a memory unit of the R/W type is mounted on a module, a local processor of conventional type is employed for storing information in a local register at the time that information is read out and then rewriting the information from that local register in the memory unit before the memory unit is addressed again. In a memory unit of the R/W type, whenever information is written into the memory unit from the processor or otherwise under control of the processor, the information written in replaces that previously stored there. Information so represented is known as digital information and a signal representing a series of such digits is known as a digital signal.

Conventionally, the number of cells in any memory unit is some base number times a power of 2. Thus, the total number of cells in a memory unit which represents the local capacity of the memory unit is $$LMC = R\,2^n$$

where $n$ may be any positive integer, including 0. For convenience, the number R will be referred to as the base of the local capacity of the memory units. This base is the highest common factor of the local capacities of all of the addressable memory units, or some integral submultiple thereof.

In the usual practice and in the minicomputers specifically referred to herein, the base number R is 1K, that is 1024, and the memory units are rectangular.

A distinction will be made hereinafter between the local memory capacity of an individual memory module, and the total capacity of all memory modules having memory units that are addressable at any one time by the processor.

In practice, the memory units of the various memory modules are so interconnected as to provide, in effect, a single addressable memory bank. The total capacity of this memory bank is the sum of the local capacities of the various memory modules. Each of the various cells in the respective memory units is assigned a unique address according to its location in the memory bank. These addresses are represented by consecutive decimal integers 0, 1, 2, . . . . . 32,766, and 32,767, thus providing a total of 32K addresses. The memory modules are interconnected sequentially so that their ranges are contiguous in the order, or sequence, of connection.

The memory unit on each module thus has a starting address and an ending address. The starting address of each module forms a boundary between that module and any preceding module. Each module responds to a range of addresses that includes its starting address and its ending address and the ending address is one less than the next higher boundary. The lowest outer boundary address for the memory bank is zero, this being the starting address for the entire memory bank and the highest outer boundary address is the total capacity of the memory bank, thus being one more than the highest address. Each of the memory modules is provided with a range detector which makes it possible for only the proper memory unit to respond to a memory address signal applied to the memory bank at any one time by the processor.

This invention relates particularly to the system for setting the boundaries of the ranges of addresses to which the respective range detectors, and hence the respective memory modules, can respond.

Where a series of memory modules are thus employed to provide a total memory with consecutive addresses, such a bank of memory modules is referred to herein as a continuous bank of memory modules.

Prior Art

In the prior art, the range detectors have been set manually by means of switches located on the modules, thus introducing a danger of human error because of the possibility that the switches may be incorrectly set. A further difficulty arises in such prior art systems because of the fact that if a memory module having one local capacity is replaced by a memory module of another local capacity, then the switches of all the higher order memory modules must be reset. Such a requirement for manual resetting is, to say the least, inconvenient and, for this and other reasons, is also a source of human error.

In another technique that has been employed to ensure that an address applied by the processor, operates a memory cell of the appropriate memory module has involved a memory module selector permanently on the mother board. This selector, in effect, assumes that each of the memory modules connected in a particular position in the computer has a fixed address range and a fixed position in the order of addressing the modules in successive ranges of the total address range. Such an arrangement places a restraint on the local memory capacity of any memory module that can be plugged into any particular connector. Such an arrangement eliminates the need for the setting of range selectors which are on the individual modules, but greatly reduces the flexibility of the modular computer. It is true that a memory module of lower capacity than that assigned to a particular socket may be plugged into that socket. But if this is done, this leaves a gap in the range of addresses, thus requiring that special programming techniques be employed to avoid inoperability because of the presence of vacant addresses. Alternatively, of course, the mother board might be rewired, but this too is disadvantageous.

In still another prior art method, programs are written to take into account the specific arrangement of memory modules with which the program is to be used. However, this introduces an unnecessary complexity because reprogramming may be required if a memory module in one particular connector, other than the last memory module, is replaced by another module having a different local capacity.

BRIEF DESCRIPTION OF THE INVENTION

The improved system for setting the boundaries between contiguous memory modules overcomes the difficulties encountered in such prior systems.

This invention provides a system for automatically setting the range selectors of the respective memory modules of a continuous bank of memory modules, without human intervention, so that the ranges of the addresses are consecutively ordered without gaps and without requiring that the memory modules have predetermined local capacities or a predetermined sequence of local capacities.

More particularly, with this invention, a memory module of one local capacity may be replaced by a memory module of a different local capacity and memory modules of different capacities may be interchanged in a memory bank, without requiring resetting of switches, rewiring of controls of a mother board, or reprogramming or special programming to take the change into account, so long as the total memory capacity remains below the maximum allowable value, and so long as the total memory capacity is sufficient to handle the programs to be used in the computer.

In any event, whenever a bank of memory modules is installed, regardless of whether the order of local capacities is changed, with this invention the ranges of addresses are assigned automatically to the individual modules. Thus, any memory module may be replaced by any other without rendering the memory system inoperative, so long as the total memory capacity of the central processor.

In accordance with this invention, each memory module includes a local memory capacity signal source that provides a signal representative of the local memory capacity of that module. It also includes an adder coupled to that signal source and to the last previous module in the series for adding the local memory capacity to the cumulative memory capacity of the preceding modules to provide a new cumulative capacity. In addition, it includes means for supplying a signal representing that new cumulative capacity to the next following module, if there is one. The signals received from the prior module and from the local range signal source are employed to set the local address range detector so that each memory module will respond only to the proper range of addresses. The signal received by a module establishes its starting address or lower boundary. And the signal developed by the addition of the local memory capacity to the starting address exceeds the ending address by 1, and thus establishes the upper boundary for the module. This boundary also constitutes the starting address for the next module in the series, if there is one. The upper boundary for the last memory module represents the total memory capacity of the entire memory bank.

The processor module is provided with a starting address signal source for supplying a starting address to the first memory module. This address is zero if no memory unit is installed on the processor module, otherwise the starting signal represents the capacity of the memory unit that is on the processor. The processor also includes a register for receiving the storing a signal from the last memory module to define the upper boundary of the bank of memory modules. In effect, the series of modules is a closed series with the processor module at the beginning and at the end of the series.

In the best embodiment of the invention now known, the range detector on each memory module includes two comparators. One of them is set to determine whether the address signal applied to a memory module represents an address that lies at or above the starting address for that module and also whether it lies at or below the ending address of that module. Stated differently, the range detector serves to determine whether the address signal applied to a memory module represents an address at or above the lower boundary for the module and below the upper boundary for the module. If both conditions are satisfied, then the address signal corresponds to a proper address of the module.

The invention also provides for automatically storing in a register on the processor module a signal representative of the total memory capacity of the continuous bank of memory modules. The invention also provides a comparator for determining whether an address sought by the processor lies beyond the total capacity of the memory bank and also provides an arrangement whereby the computer will automatically generate an interrupt signal. Such a signal causes the computer to take into account the fact that the capacity of the memory bank has been exceeded, such as by interrupting the operation of the central processor unit and producing an indication on the console that the interruption has occurred.

In effect, the local memory capacity signal source and the means for setting the address detector of each module comprises a local calculator. According to this invention, these calculators are connected to operate in tandem so that whenever the electric power is turned on and has reached a satisfactory level, these local calculators are operated sequentially, one at a time, by a signal from the prior module in the series so as to automatically set the local range detector of each of the modules to successive contiguous ranges of the total capacity of the memory bank and then to set a total memory capacity register of the processor. The calculators on the memory modules are so designed that each is ineffective until it reaches a range address signal from the prior module (i.e., processor module or memory module) and are also so designed that when a starting signal is received, a new one is calculated and is transmitted to the next module in series. Thus, in effect, the address boundaries for the memory modules are established by the joint interaction of the processor and the calculators located on the memory modules.

The foregoing and other aspects and advantages of the invention will be described herein with reference to the accompanying drawings where:

FIG. 5 is a schematic diagram of a local memory capacity signal source;

FIG. 6 is a partly schematic, partly block diagram of a starting signal source that is mounted on the processor module, together with a range detector of the type employed on the processor module when a memory unit is installed on the processor module;

FIG. 9 is a perspective view, partly exploded, of the socket and plug board arrangement of a module minicomputer; and FIG. 10 is a schematic front view of a console of a modular minicomputer.

GENERAL DESCRIPTION OF THE INVENTION

Figure 1:
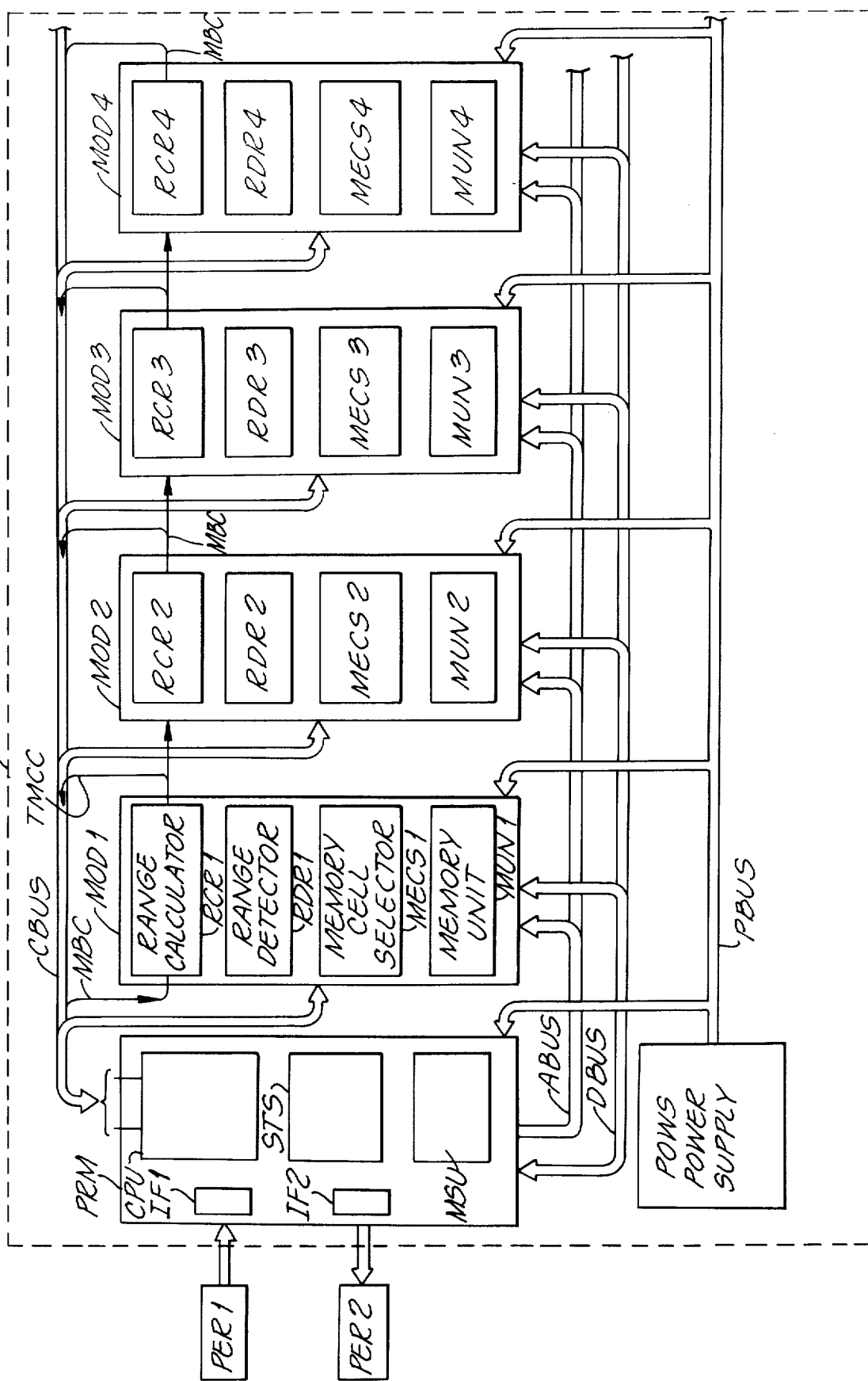
FIG. 1 is a block diagram of a module minicomputer embodying the invention.

The general arrangement of a modular minicomputer in accordance with the present invention, is illustrated in FIG. 1. The minicomputer MCR comprises a central processing unit CPU on a processor module PRM, four memory modules MOD1, MOD2, MOD3, and MOD4, two peripheral units PER1 and PER2, and a regulated power supply POWS. Each of the memory modules MOD includes an address range calculator RCR, an address range detector RDR, a memory unit MUN, and a memory cell selector MECS. A starting system STS is also included as part of the processor module PRM for initiating the operation of the range calculators RCR. The minicomputer MCR is provided with I/0 interface units IF1 and IF2 for coupling the central processing unit CPU to an input peripheral device PER1 and to an output peripheral device PER2 respectively.

For convenience, subscripts, or suffixes, 1, 2, 3, and 4 are sometimes added to the legends representing components on the respective modules MOD1, MOD2, MOD3, and MOD4, to distinguish components forming parts of one of the memory modules from components of other modules. And sometimes the suffix P is employed to distinguish a component of the processor module from similar components of a memory module. In other instances, the subscripts are omitted where the discussion applies to components on any module or where the meaning is otherwise clear without the need for adding a subscript.

A power bus PBUS supplies power from the power supply to the processor module and to each of the memory modules MOD.

Three operating multiconductor buses interconnect the processor CPU with the memory modules, namely, a control bus CBUS, an address bus ABUS, and a data bus DBUS.

The multiple conductor control bus CBUS is employed for transferring control signals from the processor to the memory modules and from the memory modules to the processor in a conventional manner, except as specifically described below. A special segmental conductor MBC that forms part of the control bus is provided for connecting the input of the range calculator RCR1 of the first memory module MOD1 to the starting system STS on the processor module, and the input of the range calculators in each following memory module MOD to the output of the next preceding memory module. One of the conductors also connects a total memory capacity register TMCR in the processor module to the output of the memory modules MOD.

The multiple conductor address bus ABUS is employed for transmitting an address signal in parallel form from the processor to all of the memory modules simultaneously in conventional manner.

The multiple conductor data bus DBUS is employed for transmitting data from the processor to the memory units MUN to store information therein or from the memory units to the processor to retrieve information from the memory units in conventional manner. In this connection, it will be understood that the digital information stored in the memory units may be program instructions, addresses to be utilized in connection with carrying out instructions, or it may be numerical or other data to be used in processing.

Figure 2:
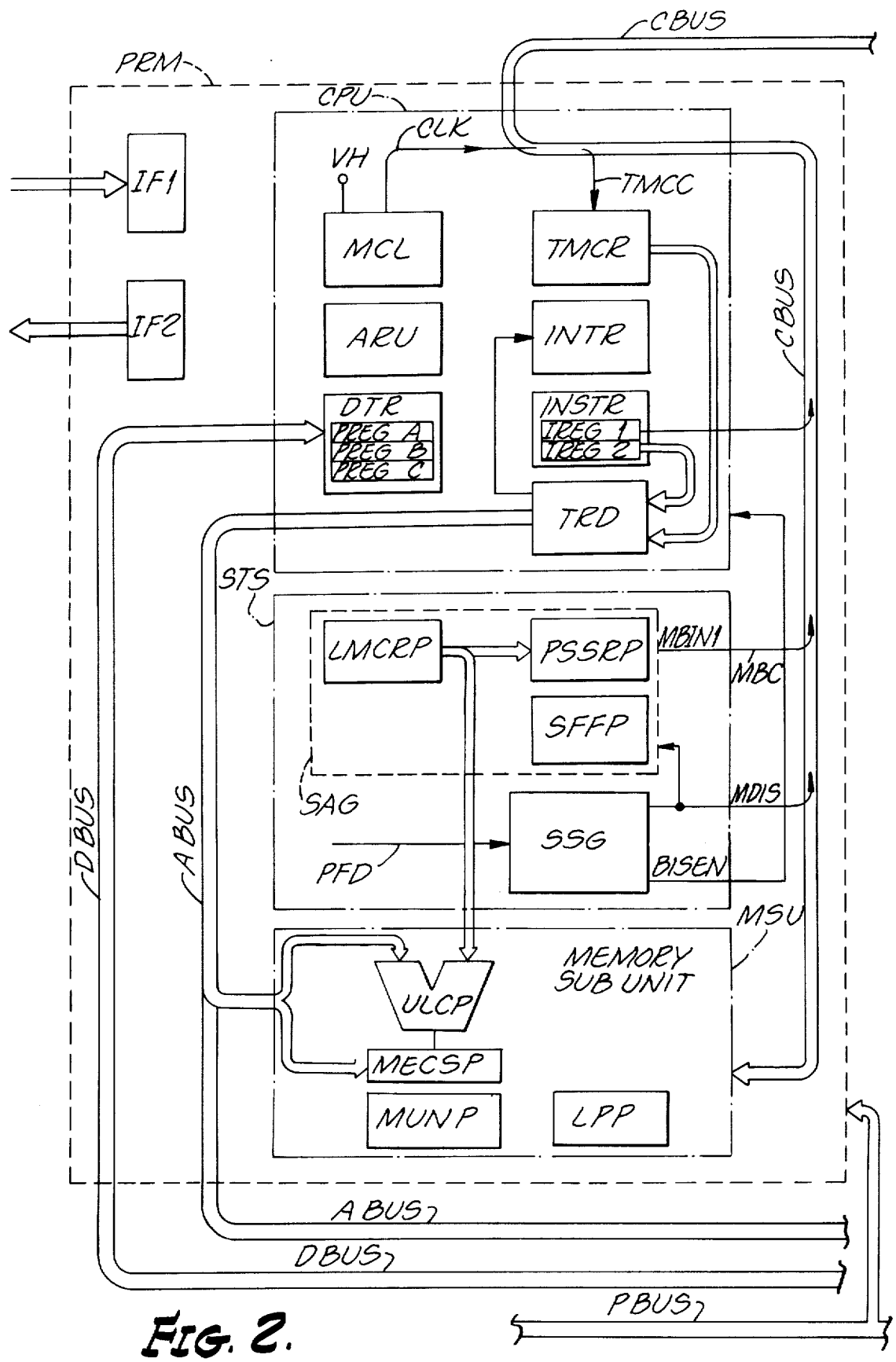
FIG. 2 is a block diagram of a typical processor employed in the invention.

A processor module that may be employed in the practice of the invention is illustrated in somewhat more detail in FIG. 2. The module includes the central processor unit CPU, and the starting system STS, and a memory subunit MSU. As will be explained later, the memory subunit MSU is optional. It will be noted that a number of the components on the processor module are the same type as components present on the memory modules.

Typically, in a programmed minicomputer, instructions are transferred to an instruction register INSTR in the processor one at a time, under program control in a manner well known in the art. An instruction may consist of two parts. For simplicity of explanation, it will be assumed that each of these parts consists of one word of 16 bits each and that they are stored in two 16-bit registers IREG1 and IREG2 of the instruction register INSTR. The first word of the instruction stored in register IREG1 specifies the operation to be performed. The second word stored in register IREG2 describes the address of the memory bank which is involved in the operation.

Other registers PREGA, PREGB, PREGC in a set DTR of data registers are included in the processor for storing the data to be processed, or to receive and store data from the memory bank or otherwise in accordance with the instruction. Thus, a register is employed to store data which is to be transferred to a memory unit and another register is employed to receive information from a memory unit, all in accordance with the instruction. These registers are also 16-bit registers and they are employed to transmit 16-bit information signals from the processor to 16-bit memory cells located at the specified address in the memory bank, or to receive 16-bit information signals from a 16-bit memory cell located at such address.

The most significant bit of the address word is employed for storing a 1 or a 0 according to whether a direct addressing or an indirect addressing process is to be employed. For purposes of illustrating the invention, it is sufficient to consider a direct addressing process. In either case, the address of the cell to be contacted or accessed in the memory bank is specified by the remaining 15 bits. Only 15 bits of the address are used on the ABUS to communicate with the memory modules MOD. The sixteenth bit is employed only internally by the processor module PRM.

The instruction may require that data be written into a cell at a particular location of the memory bank or read from the cell. The address of the location of the cell to be accessed is transmitted from the processor over the address bus ABUS. The 15 bits of the address are transmitted in parallel over 15 conductors of that bus. The data which is to be read or written, as the case may be, is transferred over the 16 conductors of the data bus DBUS.

In operation, various control signals, which are required to sequence various types of operations and for enabling various components of the system to function to perform those operations, are transmitted over conductors of the multiple conductor control bus CBUS. Computers of this general type are well known (see, for example, *Minicomputers for Engineers and Scientists* by Granino A. Korn, McGraw-Hill, 1973). Well known computers of that type include the ALPHA 16 which is manufactured by Computer Automation, Inc., the assignee of this application, the PDP 11 which is manufactured by Digital Equipment Corporation, and the NOVA 1200 manufactured by Data General, Inc.

It will be understood, of course, that where the operation is to be performed with the aid of some local registers that are part of the central processing unit CPU, the address word need not be employed. To this end, a suitable signal is stored in the first instruction word to determine whether or not access to the memory bank is required to carry out the instruction.

In practice, a suitable program written in the language of the machine, is fed into the computer through the input peripheral unit PER1 in a conventional manner. The particular computer to which the invention is described herein is so designed that the last eight words of the memory bank are employed for storing a bootstrap program. More particularly, the interface unit IF1 that connects with the input device PER1 uses that bootstrap program for reading in a conversion program and storing it in the memory bank. This conversion program is then employed for reading in other programs and data and storing them in a part of the memory bank. Though not required for an understanding of the invention, reference is made to the following manuals to facilitate an understanding of some of the features of the ALPHA LSI computer to which the invention is applied:

1. "Naked Mini LSI/ALPHA LSI Programming Reference Manual," No. 10077-00A0, April 1973.
2. "Naked Mini LSI/ALPHA LSI I/O Interface Design Guide," No. 10079-00A0, April 1973.
3. "Naked Mini LSI/ALPHA LSI Engineering Specification," No. 10080-00A0, April 1973.

It is to be understood, however, that the invention described and claimed herein is not described in that material or, so far as is known, elsewhere at this time.

As is usual, once a program is stored and the execution of the program is initiated in a conventional manner such as by operating a starting switch on the console of the computer, and various results determined in the execution of the program are displayed on a peripheral output device PER2, such as by printing out on a teletypewriter.

In the specific embodiment of the invention illustrated, the transmitted address signal consists of 15 bits AB14, ..., AB00. The five most significant bits AB14 ... AB10 represent the range component ABR while the entire number specifies the overall, or absolute, address in the total capacity of the memory bank. As will be seen, it is not necessary to employ the AB15 bit as part of the range component because of the fact that the initial address is 0.

In Table I there are shown the relations of the bit positions to the addresses. Each bit position represents the exponent of a power of 2. These powers and their values are expressed in decimal notation in columns 2 and 3 respectively.

In Table II there are shown the starting (S) and the ending (E) addresses of memory cells of individual memory units that have the capacities of 1K, 2K, 4K, 8K, and 16K. In the body of the table, the starting and ending addresses are shown in binary notation with the 0's and 1's corresponding to the bit signals AB00, AB01, etc., appearing at the head of the table. The last column shows the starting and ending addresses in decimal notation. The corresponding starting and ending addresses for each of the memory units specified, are designated by (S) and (E).

The local starting address for each memory unit is 0. Because of this fact, the local ending address is the local memory capacity LMC of the memory unit minus 1.

In Table III there are shown the starting (S) and the ending (E) addresses of the respective memory modules for a typical configuration of a memory bank having a total capacity of 16K and composed of four memory units having capacities of 4K, 2K, 8K, and 2K consecutively on the four respective modules.

The addresses given in Table III represent the addresses of the memory cells in the 16K memory bank. But the local addresses for each of the memory units on the four memory modules are as specified in Table II.

TABLE I

| | | |
|---|---|---|
| AB14 | $2^{14}$ | 16384 |
| AB13 | $2^{13}$ | 8192 |
| AB12 | $2^{12}$ | 4096 |
| AB11 | $2^{11}$ | 2048 |
| AB10 | $2^{10}$ | 1024 |
| AB09 | $2^{9}$ | 512 |
| AB08 | $2^{8}$ | 256 |
| AB07 | $2^{7}$ | 128 |
| AB06 | $2^{6}$ | 64 |
| AB05 | $2^{5}$ | 32 |
| AB04 | $2^{4}$ | 16 |
| AB03 | $2^{3}$ | 8 |
| AB02 | $2^{2}$ | 4 |
| AB01 | $2^{1}$ | 2 |
| AB00 | $2^{0}$ | 1 |

TABLE II

ADDRESS LIMITS OF INDIVIDUAL MEMORY UNITS

| | | Local Address - (Binary) | | | | | | | | | | | | | | | Local Address (Decimal) |
|---|---|---|---|---|---|---|---|---|---|---|---|---|---|---|---|---|---|
| | | AB-14 | AB-13 | AB-12 | AB-11 | AB-10 | AB-09 | AB-08 | AB-07 | AB-06 | AB-05 | AB-04 | AB-03 | AB-02 | AB-01 | AB-00 | |
| 1K Memory Unit | S | 0 | 0 | 0 | 0 | 0 | 0 | 0 | 0 | 0 | 0 | 0 | 0 | 0 | 0 | 0 | 0 |
| | E | 0 | 0 | 0 | 0 | 0 | 1 | 1 | 1 | 1 | 1 | 1 | 1 | 1 | 1 | 1 | 1023 |
| 2K Memory Unit | S | 0 | 0 | 0 | 0 | 0 | 0 | 0 | 0 | 0 | 0 | 0 | 0 | 0 | 0 | 0 | 0 |
| | E | 0 | 0 | 0 | 0 | 1 | 1 | 1 | 1 | 1 | 1 | 1 | 1 | 1 | 1 | 1 | 2047 |
| 4K Memory Unit | S | 0 | 0 | 0 | 0 | 0 | 0 | 0 | 0 | 0 | 0 | 0 | 0 | 0 | 0 | 0 | 0 |
| | E | 0 | 0 | 0 | 1 | 1 | 1 | 1 | 1 | 1 | 1 | 1 | 1 | 1 | 1 | 1 | 4095 |
| 8K Memory Unit | S | 0 | 0 | 0 | 0 | 0 | 0 | 0 | 0 | 0 | 0 | 0 | 0 | 0 | 0 | 0 | 0 |
| | E | 0 | 0 | 1 | 1 | 1 | 1 | 1 | 1 | 1 | 1 | 1 | 1 | 1 | 1 | 1 | 8191 |
| 16K Memory Unit | S | 0 | 0 | 0 | 0 | 0 | 0 | 0 | 0 | 0 | 0 | 0 | 0 | 0 | 0 | 0 | 0 |
| | E | 0 | 1 | 1 | 1 | 1 | 1 | 1 | 1 | 1 | 1 | 1 | 1 | 1 | 1 | 1 | 16383 |

TABLE III

ADDRESS LIMITS OF TYPICAL CONFIGURATION OF 16K MEMORY BANK CONSISTING OF 4K, 2K, 8K AND 2K MEMORY UNITS

| | | Processor Address - (Binary) | | | | | | | | | | | | | | Processor Address (Decimal) |
|---|---|---|---|---|---|---|---|---|---|---|---|---|---|---|---|---|
| | | AB-14 | AB-13 | AB-12 | AB-11 | AB-10 | AB-09 | AB-08 | AB-07 | AB-06 | AB-05 | AB-04 | AB-03 | AB-02 | AB-01 | AB-00 | |
| 1st Memory Unit (4K) | S | 0 | 0 | 0 | 0 | 0 | 0 | 0 | 0 | 0 | 0 | 0 | 0 | 0 | 0 | 0 | 0 |
| | E | 0 | 0 | 0 | 1 | 1 | 1 | 1 | 1 | 1 | 1 | 1 | 1 | 1 | 1 | 1 | 4095 |
| 2nd Memory Unit (2K) | S | 0 | 0 | 1 | 0 | 0 | 0 | 0 | 0 | 0 | 0 | 0 | 0 | 0 | 0 | 0 | 4096 |
| | E | 0 | 0 | 1 | 0 | 1 | 1 | 1 | 1 | 1 | 1 | 1 | 1 | 1 | 1 | 1 | 6143 |
| 3rd Memory Unit (8K) | S | 0 | 0 | 1 | 1 | 0 | 0 | 0 | 0 | 0 | 0 | 0 | 0 | 0 | 0 | 0 | 6144 |
| | E | 0 | 1 | 1 | 0 | 1 | 1 | 1 | 1 | 1 | 1 | 1 | 1 | 1 | 1 | 1 | 14335 |
| 4th Memory Unit (2K) | S | 0 | 1 | 1 | 1 | 0 | 0 | 0 | 0 | 0 | 0 | 0 | 0 | 0 | 0 | 0 | 14336 |
| | E | 0 | 1 | 1 | 1 | 1 | 1 | 1 | 1 | 1 | 1 | 1 | 1 | 1 | 1 | 1 | 16383 |

When using a base of 1K, the memory capacities of the memory modules may be 1024, 2048, 4096, etc. In the system of addressing employed in the minicomputer MCR specifically first described herein in which no memory unit of the memory bank is included in the processor, the lowest or starting address SA1 of the first memory module is 0; the starting address SA2 of the second memory module is LMC1; the starting address SA3 of the third module is (LMC1 + LMC2); and so on. Thus, the starting address of any module is always some integral multiple of the base 1K. In such a system, the successive addresses of the entire memory bank are represented by all the positive integers less than the total capacity of the memory bank, including 0. The ranges of addresses of the successive memory modules are contiguous, that is, the starting address of each memory module is one more than the ending address of the previous module. In this particular arrangement, the starting addresses SA1, SA2, SA3, etc., and the total capacity of the memory bank define the boundaries of the modules in the memory bank.

In case a memory unit is included in the processor, account is taken of this fact and, for all practical purposes, the starting and ending addresses of each module are increased by the memory capacity LMC0 of the memory unit in the processor. In this case, the lowermost boundary of the memory bank is 0 and it is located on the processor and the starting address SA0 of the memory bank is 0 and is the starting address of the memory unit that is in the processor.

When a memory capacity base of 1K is employed, the total capacity of any memory bank up to 32K is indicated by the bits AB14–AB10 Since the total memory capacity that may be addressed by the processor is limited to 32K, only the five bits AB14–AB10 need be used in order to select the memory module that carries the memory unit that is to be addressed when any particular absolute address signal is applied to the address bus ABUS.

The signals AB14 . . . AB10 are sometimes referred to herein as the range component ABR of the address for the memory bank. The range components of the boundary addresses that apply with a memory capacity base of 1K are indicated in Table IV. Inasmuch as the upper boundary may be as much as 32K with the specific processor described, it is also necessary to consider one additional bit, namely, the bit corresponding to $2^{15}$. For this reason, Table IV bears the legends L15, L14, L13, L12, L11, and L10 at the heads of the bit columns where it is understood that L may signify either a lower limit LL or an upper limit UL.

TABLE IV

RANGE COMPONENTS OF ADDRESS LIMITS FOR A MEMORY CAPACITY BASE OF 1K

| | L15 | L14 | L13 | L12 | L11 | L10 |
|---|---|---|---|---|---|---|
| 0 | 0 | 0 | 0 | 0 | 0 | 0 |
| 1K | 0 | 0 | 0 | 0 | 0 | 1 |
| 2K | 0 | 0 | 0 | 0 | 1 | 0 |
| 3K | 0 | 0 | 0 | 0 | 1 | 1 |
| 4K | 0 | 0 | 0 | 1 | 0 | 0 |
| 5K | 0 | 0 | 0 | 1 | 0 | 1 |
| . | . | . | . | . | . | . |
| 8K | 0 | 0 | 1 | 0 | 0 | 0 |
| . | . | . | . | . | . | . |
| 16K | 0 | 1 | 0 | 0 | 0 | 0 |
| . | . | . | . | . | . | . |
| 32K | 1 | 0 | 0 | 0 | 0 | 0 |

If, indeed, the absolute address lies within the range of a particular module, the particular memory cell that is to be selected is determined by the local address component that includes all of the variable bits within the local capacity of the memory unit as illustrated in Table II.

Thus, if a 1K memory unit is being addressed, regardless of where it is located in the series of memory modules, the local address is determined by the bits AB09, . . . , AB00. If a 2K memory unit is being addressed, regardless of where it is located in the series of memory modules, the local address is determined by the bits AB10, . . . , AB00. If a 4K memory unit is being addressed, regardless of where it is located in the series of memory modules, the local address is determined by the bits AB11, . . . , AB00. And if an 8K memory unit is being addressed, regardless of where it is located in the series of memory modules, the local address is determined by the bits AB12, . . . , AB00. In any event, the local address is determined by that part of the address signal in which the most significant bit corresponds to the most significant bit having a 1 in it for the local ending address (see Table II). This part of the address signal is called the local address component.

Because of the fact that the right-most bits of the address bus AB09, . . . , AB00 may always be either 0 or 1 depending upon the local address capacity on any particular module, none of these bits need be tested by the range detector on a module to determine whether the absolute address falls within the range of the starting address and the ending address of that module. The remaining bits AB14, . . . , AB10 of the address signal are supplied from the address bus ABUS to the range detectors RDR. For convenience, this part of the absolute address signal is referred to as the range component ABR of the absolute address signal.

Some of the right-most bits of the 5-bit range component may also be part of the local address signal. Thus, the local address component and the range component sometimes overlap.

To simplify the following description, it is assumed that all five bits of the entire 5-bit range component AB14, . . . , AB10 are tested in each module to determine whether the absolute address lies within the range of the respective modules.

In some applications of the invention, the order of local addresses in a memory unit is not always the same as the order of the absolute address. This is most evident when the local memory capacity is not evenly divisible into the starting address or lower limit.

Nevertheless, because of the properties of the binary numbers, it is only necessary to address any particular memory module of a given capacity with those signals which represent digits which are variable as indicated in Table II. By employing such digit components, a one to one correspondence always exists between a local address on a memory unit, and the abolute address that lies within the range of the memory unit, even though the order in which the cells of the memory unit are addressed, may depend upon the starting address of the memory module.

It will be understood that the range detection and addressing may be achieved in other ways, such as by utilizing the upper boundary of a module as the ending address and setting the starting address at one more than the lower boundary. Similarly, the invention could be used with address gaps and address overlap, though such variations are undesirable. For example, it is not necessary to employ both a lower limit comparator and an upper limit comparator in each memory module. It would be sufficient, for example, to employ only a lower limit comparator on each module, and to provide means whereby the last module in the series which responds to produce an enable signal would feed that enable signal back to prior modules to inhibit addressing operations in those modules. In this way, as with the embodiment of the invention described, it would also be possible to enable only one module at a time, namely, the proper module which includes the cell within the proper address range.

While the invention is described with reference to the employment of a local memory capacity register on each of the modules, it will be understood that the invention may also be practiced by addressing the cells of the memory unit of each module one at a time and thus locate the lower limit and the upper limit to establish the starting address and the ending address for each module.

Automatic Range Setting

From the foregoing description, it is clear that the lowest address, that is, the lower limit (LL) of the addresses of any memory module, is the same as the lower boundary. From the foregoing description, it is also clear that the highest address is one less than the upper boundary or upper limit (UL) of the addresses of any module. It is also clear that the boundary between any pair of successive modules is the same as the starting address of the higher module in the pair.

In accordance with the embodiment of the invention described, the lower boundary of the memory bank is zero and the remaining boundaries are all calculated automatically, module by module, in the order in which the modules are connected in the memory bank. Stated differently, the lower limit LL and the upper limit UL of each of the range detectors RDR on the respective modules are set up automatically, module by module, in the order in which the modules are connected, that is positioned, in the memory bank.

As used herein, the term address range applies to the span of addresses extending from the starting address to the ending address of a module when installed in the memory bank, as illustrated in Table III. Thus, the address range of a module in the total range of addresses of the entire memory bank, depends upon the local memory capacity of the module and upon the location of the module in the memory bank.

The ranges for the successive modules are contiguous in that the difference between the starting address of one module and the ending address of the preceding module is 1. As a result, there are no address gaps in the entire memory bank.

For the purpose of this description, unless specifically stated otherwise, it will be assumed that no memory unit forming part of the memory bank is included in the processor CPU.

In this invention, an address signal MBIN is received at the input of the calculator of each memory module and is modified by the local memory capacity of each module to produce an output signal MBOT. The input signal MBIN establishes the lower boundary for the module and the output address signal MBOT establishes the upper boundary or upper limit UL for the module.

In operation, a starting address signal MBIN1 having its origin in the processor module PRM, is the first of a series of signals MBIN and MBOT that are ripped through the four memory units MOD1, MOD2 MOD3 and MOD4 to set up appropriate boundaries defining the ranges between the starting address and the ending address in the range detector RDR of the respective modules.

The output signal MBOT1 of the first module becomes the input signal MBIN2 for the second module. The output signal MBOT2 of the second module becomes the input signal MBIN3 for the third module. The output signal MBOT3 of the third module becomes the input signal MBIN4 for the fourth module. The output signal MBOT4 of the fourth module becomes the final input signal for the total memory capacity register TMCR in the processor. All the output signals MBOT are transmitted to the processor on a common time-shared conductor TMCC. The digital signal component represented by the bits in the time slots TSA . . . TSF are stored in the total memory capacity register TMCR. The last such component to be transmitted survives and thus represents the total memory capacity of the memory bank. As explained above, the input signal of each module represents the sum of the memory capacities of the preceding modules.

In the embodiment of the invention described, the input signals MBIN and the output signals MBOT are in serial form as they are transferred from one module to another, but exist in parallel form within the modules.

The range calculator RCR of each memory module includes a serial-to-parallel shift register SPSR at its input, an adder ADR, and a parallel-to-serial shift register PSSR at its output. Each range calculator also includes a local memory capacity signal source in the form of a simple register LMCR which provides a signal representative of the local capacity LMC of the memory unit MUN of the memory module on which it is mounted. The local memory capacity signal source LMCR is a simple switching device that is set at the time the memory unit MUN is installed on the module. The register LMCR may be a hardwired device that is wired in during the manufacturing process.

As more fully explained below in connection with FIG. 8, when the power is turned on and the voltages supplied by the regulated power supply POWS have attained suitable operating values, a zero signal representing the starting address of the first module is transmitted to the first memory module MOD1.

This starting address STA1 at the first module is held in the output of the serial-to-parallel shift register SPSR1. The number LMC1 representing the capacity of the local memory unit MUN1 of the first module MOD1 is added to the starting address thereby establishing the starting address STA2 on the second module and the upper boundary for the first module. This starting address STA2 is held in the output of the adder ADR1. It is also transmitted through the parallel-to-serial register PSSR as part of the signal MBOT1 or MBIN2 to the input of the second module MOD2.

The starting address STA2 of the second module is held in the output of the serial-to-parallel shift register SPSR2. The number LMC2 representing the capacity of the local memory unit MUN2 of the second module MOD2 is added to this starting address thereby establishing the starting address STA3 on the third module and the upper boundary for the second module. This starting address STA3 is held in the output of the adder ADR2. It is also transmitted through the parallel-to-serial register PSSR as part of the signal MBOT2 or MBIN3 to the input of the third module MOD3.

The starting address STA3 of the third module is held in the output of the serial-to-parallel shift register SPSR3. The number LMC3 representing the capacity of the local memory unit MUN3 of the third module MOD3 is added to this starting address thereby establishing the starting address STA4 on the fourth module and the upper boundary for the third module. This starting address STA4 is held in the output of the adder ADR3. It is also transmitted through the parallel-to-serial register PSSR as part of the signal MBOT3 or MBIN4 to the input of the fourth module MOD4.

This starting address STA4 of the fourth module is held in the output of the serial-to-parallel shift register SPSR4. The number LMC4 representing the capacity of the local memory unit MUN4 of the fourth module MOD4 is added to the starting address thereby establishing the starting address STA5 on the processor and the upper boundary for the fourth module and for the memory bank as a whole. This address STA5 is held in the output of the adder ADR4. It is also transmitted through the parallel-to-serial register PSSR as part of the signal MBOT4 or MBIN5 over the conductor TMCC to the total memory capacity register TMCR of the processor.

From the foregoing, it is apparent that the process of establishing a starting address for a particular module, and adding a signal representing the local memory capacity to determine the starting address for the next following module, also establishes the ending address for the particular module since the ending address for a particular module is one less than the starting address for the next following module.

As the signals ripple through the memory modules to produce the starting addresses, the signal MBOT appearing at the output of each module is fed back over one of the control lines to a storage register TMCR in the processor module PCM so that after the ripple-through process is completed, the total memory capacity of all the memory modules in the memory bank is stored in that register TMCR. As mentioned previously, in the specific embodiment of the invention described, it is assumed that the total memory capacity does not exceed 32K.

Subsequently, whenever the processor is operated to address one of the memory units, the address signal to be applied to the memory modules is compared with the signals stored in the total memory capacity register TMCR to determine whether the address lies within the total range of the memory bank. Such control is obtained by means of a total range detector unit TRD. This unit includes a comparator that detects whether the address lies within the installed total memory capacity (in this case, 16K) of the processor and a multiple conductor gating unit for transmitting the address and executing the next instruction only if the address lies within that range. If the address lies outside that range, a program interrupt signal is generated that indicates that the processor has attempted to access a memory cell in an area beyond the installed memory.

DETAILED DESCRIPTION OF THE INVENTION

The modules of the modular computer of this invention comprise, for the most part, standard components, or building blocks, that are interrelated in a new, synergistic, way to achieve automatic range allocation for the addresses of various memory units. Certain of those building blocks are described in "The TTL Data Book for Design Engineers," First Edition, 1973, published by Texas Instruments, Inc. This work will be referred to hereinafter, for brevity, as the TI Data Book.

As previously mentioned, the computer described herein utilizes 16-bit words for communicating between the processor and other parts thereof. More particularly, the processor utilized in the embodiment of the invention described, utilizes a 15-bit signal for addressing the various memory cells. As previously explained, fifteen bits of this word are employed to represent the address of a memory cell which is to be addressed at any one time for either writing data into the cell or reading data out of the cell. The remaining bit is used for a special purpose previously mentioned.

As is well known, a binary digital signal may be represented by a plurality of electrical bit signals, each of which represents either a 1 or a 0. A binary digit signal may be in the form of a stream of pulses, or high-level voltages, corresponding to 1's, mixed with non-pulses, or low-level voltages, corresponding to 0's. A binary digital signal represents a binary number consisting of a series of digits. The positions of the digits are referred to herein as digit positions. The values of the binary digits are referred to as bits, and the signals representing those values are referred to as bit signals. Thus, a 15-bit address signal is made up of fifteen bit signals $AB14, AB13, \ldots, AB00$, corresponding to the last 15-bit positions $D14, D13, \ldots, D00$.

When the electrical signals representing the bits appear successively, the corresponding binary number is said to be represented in serial form. Such a digital signal can be transmitted over a single conductor. When electrical signals representing the bits appear simultaneously or are transmitted simultaneously over a plurality of conductors, the corresponding binary number is said to be represented in parallel form. Signals in serial form and signals in parallel form are both used in the specific embodiment of this invention, disclosed in detail herein.

When the value of a bit is 0, the signal level is 0. When the value of a bit is 1, the level of the signal is 1. A 0 level corresponds to 0 volts and a 1 level corresponds to 5 volts in the particular calculators employed herein. In some cases, a 1-signal is referred to as a true signal and a 0-signal is referred to as a false signal.

Start-Up Operations

As indicated above, the range calculators RCR that set the range limits for the range detectors, are operated in a predetermined manner whenever operation of the power supply POWS is initiated. Concurrently, power is also applied to the various components of the minicomputer as required. The manner in which these various functions are achieved are explained below in connection with FIGS. 3, 4, 5, 6, 7, and 8.

The power supply (see FIG. 7) has a two pole switch P2S that connects it to the power mains. In practice, the two pole switch may simply be a two-pronged plug which fits into a wall socket.

The power supply POWS is in the form of a regulated supply which provides at its output terminals, various voltages required to energize the electronic and other electrical components of the minicomputer. In the specific embodiment of the invention illustrated, a closely regulated operating voltage of 5 volts relative to ground is employed for energizing various electronic circuits that include transistors, diodes and the like, and a symmetrical operating voltage of +12V and −12V is employed for energizing the memory units. A coarsely regulated "hang" voltage VH of about 5 volts is also provided in order to energize a number of components.

The power supply includes two regulator sections, a coarse regulator section CRS and a fine regulator section FRS. The coarse regulator section regulates the voltages at some predetermined value above that required to stabilize the voltages at the output and the fine regulator section FRS includes Zener diodes ZD or the like, for establishing the output voltages at predetermined closely regulated stable values. The power supply includes a threshold detector PTD connected to the junction PSJ between the coarse regulator section CRS and the fine regulator section FRS for detecting when the voltage at that junction attains a satisfactory voltage high enough to assure that, as the operation of the power supply continues, the operating voltages that are provided by the power supply remain at a satisfactorily high operating level in spite of coarse variations in the voltage supplied from the power mains. When the voltage applied to the threshold detector PTD reaches that value and remains sustained there for a predetermined time, determined by the characteristics of the threshold detector PTD, it creates a "power-on" signal PFD.

Shortly after the AC power is turned on, the 5 volt hang voltage VH, which is not closely regulated, is applied to various parts of the circuitry as required for early energization. The next signal to be generated is a power-satisfactory, or power-on, signal PFD. This signal, which appears at the junction PSJ, appears there, as explained, only after the voltage at that junction attains a suitable operating value. The closely regulated of +5V, +12V and −12V are also applied over the power bus PBUS to various components of the system prior to the creation of the power-on signal PFD. When the power-on signal PFD changes from its 0 level to its 1 level, the operation of the master clock MCL, located on the processor module PRM, is initiated. At the same time, all of the memory units, including any memory unit located in the processor module PRM, are energized. Thereafter, the clock MCL supplies a 1 MHz square wave to various parts of the minicomputer MCR over a conductor in the control bus CBUS.

Figure 7:
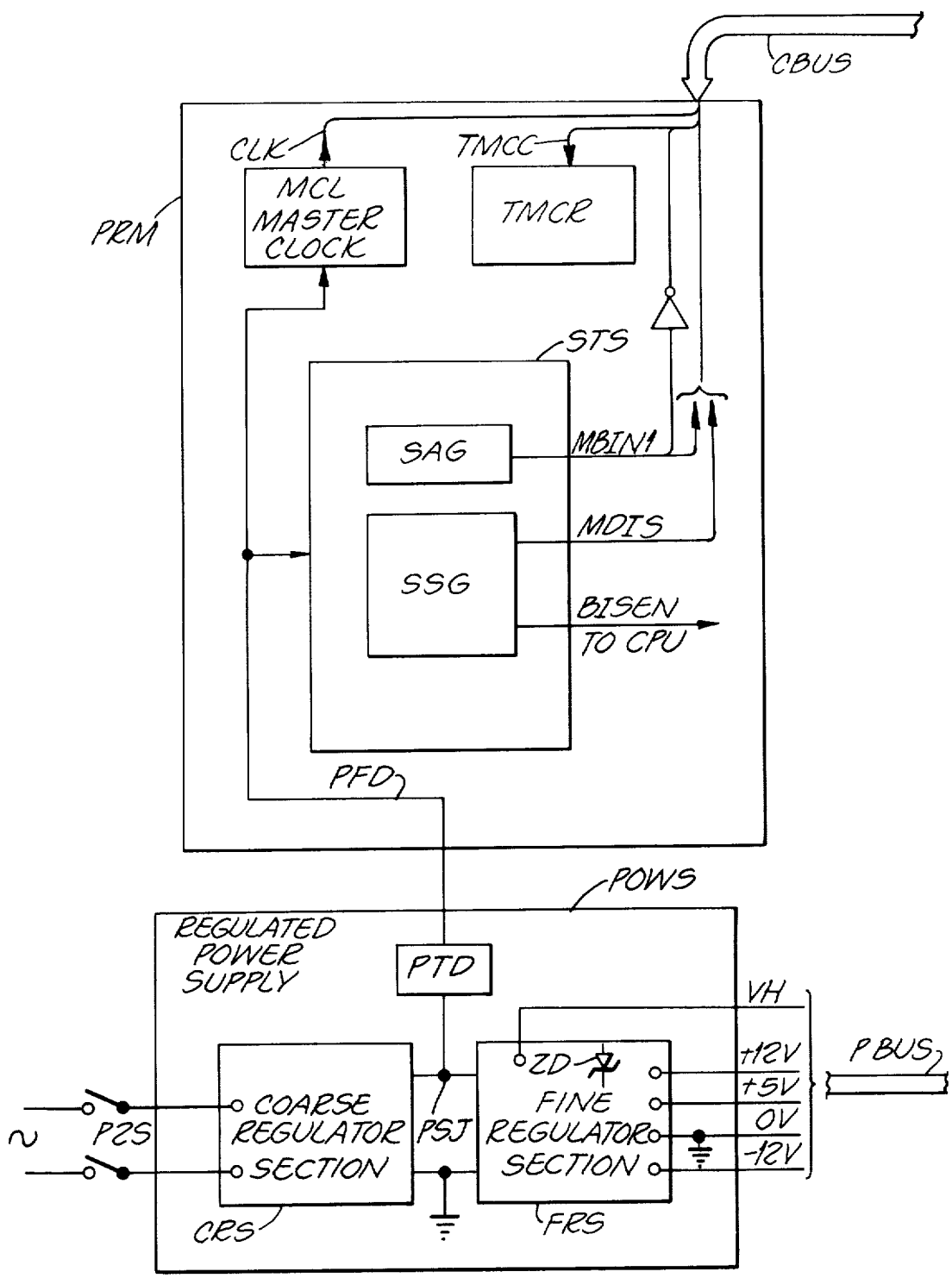
FIG. 7 is a block diagram showing the relationship between the regulated power supply and certain parts of the processor module, particularly the starting system.

The starting signal system STS of the processor module includes a starting signal generator SSG and a starting address generator SAG (see FIGS. 2 and 7). The operation of the starting signal generator SSG is initiated by application of the power-on signal PFD. When the operation of the starting signal generator SSG is initiated, it generates a memory enable signal MDIS and later a processor enabling signal BISEN in a predetermined time sequence. The MDIS signal is applied directly to the starting address generator SAG causing it to generate a starting address MBIN1 which is applied to the conductor MBC and the conductor TMCC. The signal thus applied to the conductor MBC is transmitted to the input of the range calculator RCR1 of the first memory module MOD1 and calculations occur as previously described.

Figure 8:
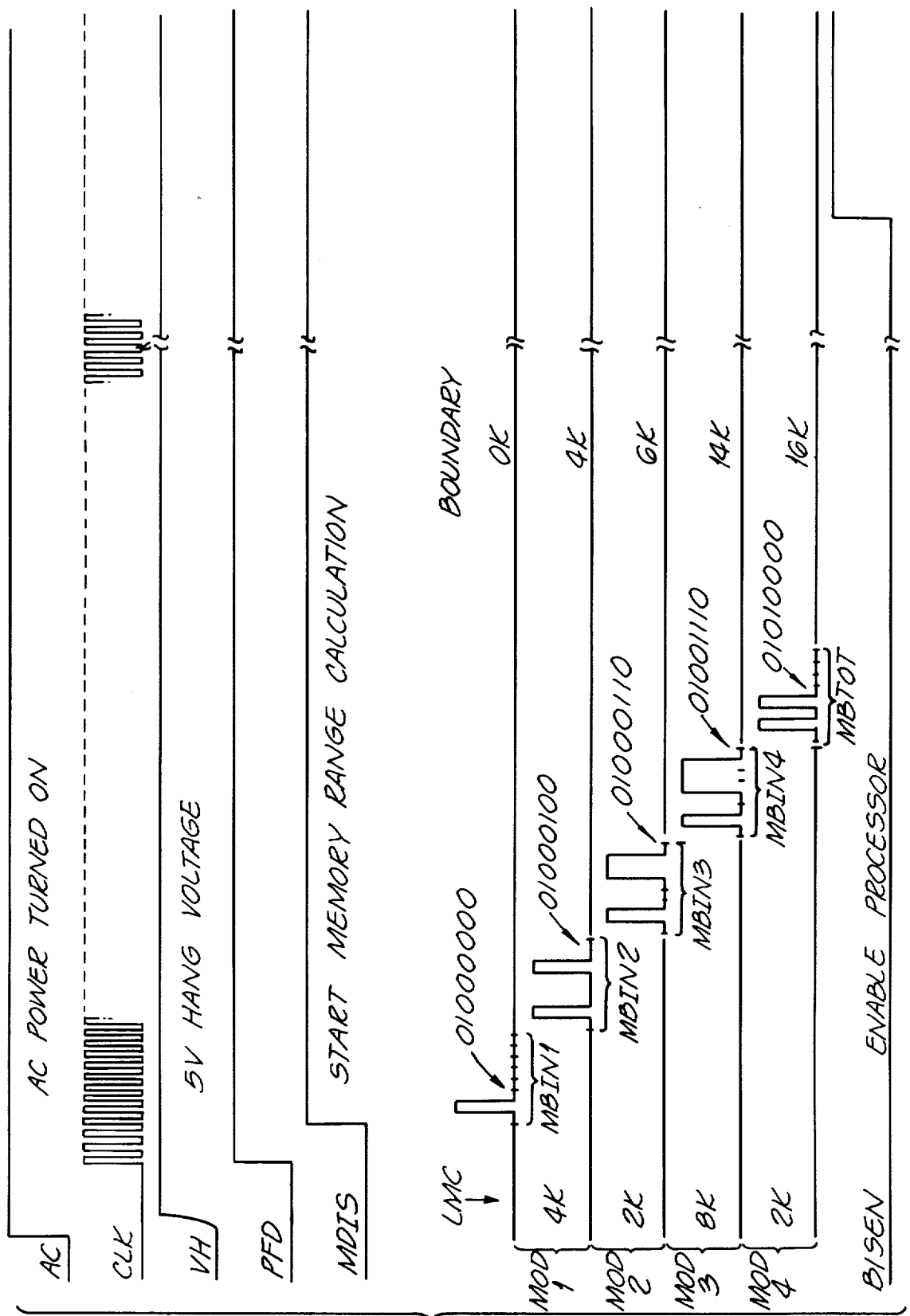
FIG. 8 is a series of time-related graphs employed to explain the operation of the system in setting up the address limits of the memory modules.

The power-on signal PFD, the memory enable signal MDIS, and the processor enable signal BISEN occur in the sequential timed relation indicated in FIG. 8.

As indicated in FIG. 8, the values of the hang voltage VH, the power-on signal PFD, the memory enable signal MDIS and the processor control signal BISEN are all initially at a 0 level. These signals are switched to a 1 level at predetermined times in order to condition or enable various parts of the modules to perform their required functions.

The power-on signal PFD switches to its 1 level after all the power supply voltages, particularly the 5 volt regulator output voltage, have reached their proper operating levels. At this time, the MDIS signal is at its 0 level causing the various components of the range calculators to clear and to enable them, thus preparing them for making the required calculations. The calculations actually start when the memory enable signal MDIS rises from a 0 level to a 1 level. It is to be noted, however, that the central processor CPU itself remains inhibited so long as the processor control signal BISEN remains at its 0 level.

At a predetermined time after the range boundary calculations have been completed, the processor control signal BISEN switches from its 0 level to its 1 level.

The processor control signal BISEN is generated in timed relation to the change of the starting signal PFD to its 1 level. While the processor control signal BISEN remains at its initial or 0 level, it prevents the processor from transmitting instructions to the memory bank. But when the processor control signal BISEN is changed to its 1 level, the processor is enabled so that when appropriate instructions are being processed, the processor is able to communicate with the memory bank, either for writing information into it or reading information out of it.

The starting signal generator is so designed that a predetermined time delay of, say, 300 μsec elapses between the switching of the PFD signal to its 1 level and the switching of the BISEN signal to its 1 level. That time interval is more than long enough to permit the calculators to calculate the address boundaries of the various modules. Thus, during that 300 μsec time interval, the lower limits LL and the upper limits UL of the various range detectors RDR are established for the respective memory modules and the total memory capacity of the memory bank is calculated and stored in the total memory capacity register TMCR.

Details for establishing the required timed relations and for interlocking these signals are not described here since the methods for designing a signal generator SSG to produce signals in such timed relations in response to a power-satisfactory signal PFD, are well known.

When the calculator start signal MDIS switches to its 1 level, it initiates the operation of the starting address generator SAG which thereupon initiates the generation and transfer of the starting address MBIN1 from the processor to the input of the first memory module of the memory bank over the conductor MBC. The remaining boundaries of the address ranges of the various modules are then automatically calculated and set one at a time.

The calculator signal MBIN inputted to each range calculator RCR is added to a signal representing the capacity LMC of the memory unit on that module to produce an output signal MBOT for establishing the starting address of the next module in series. The total time elapsed for performing the required calculations in each module commencing from the time that the input signal MBIN commences to enter the module, is only about 9 μsec. Thus, there is a slight empty time gap or delay between the termination of the feeding of an input signal MBIN into one module and the inception of the inputting of an input signal MBIN to the next following module. Hence, for a minicomputer employing four memory modules of the type described, the total time required for performing the required boundary calculations is thus only about 40 μsec. Since the processor control signal may be switched to its 1 condition any time subsequently, the 300 μsec delay is more than ample. As mentioned above, when the processor control signal BISEN switches to its 1 level the processor is prepared for operating in any required manner, such as to receive information from a peripheral unit PER1.

In the present embodiment of the invention, the calculation of the range limits, or boundaries, is accomplished by means of a single 8-bit calculator signal in the form of a serial burst MBIN transmitted from the processor and rippled through the modules as described below. This 8-bit burst is in the form of a serial signal having eight time slots as indicated at the input of a range calculator illustrated in FIG. 4 and also in FIG. 8. These time slots are generated in synchronism with the operation of the master clock MCL as described hereinafter. The eight time slots designated TSH, TSG, TSF, TSE, TSD, TSC, TSB, and TSA, occur sequentially as illustrated in FIG. 6. The first slot TSH is always at 0-level. The second time slot TSG always includes a switching signal of 1 level. The remaining time slots TSF, TSE, TSD, TSC, TSB, and TSA are employed for serially transmitting 1's and 0's corresponding to the values of the six bits L15, L14, L13, L12, L11, and L10 of the range component of the address signal as they exist at various parts of the memory bank.

In the initial burst, assuming there is no memory unit located on the processor module PRM, these six bits all have a value of zero. The input of any range calculator RCR represents the starting address for the corresponding module. The range component at the output of any calculator represents the starting address for the next module and hence is 1 more than the ending address of the module on which the calculator is located.

Figure 3:
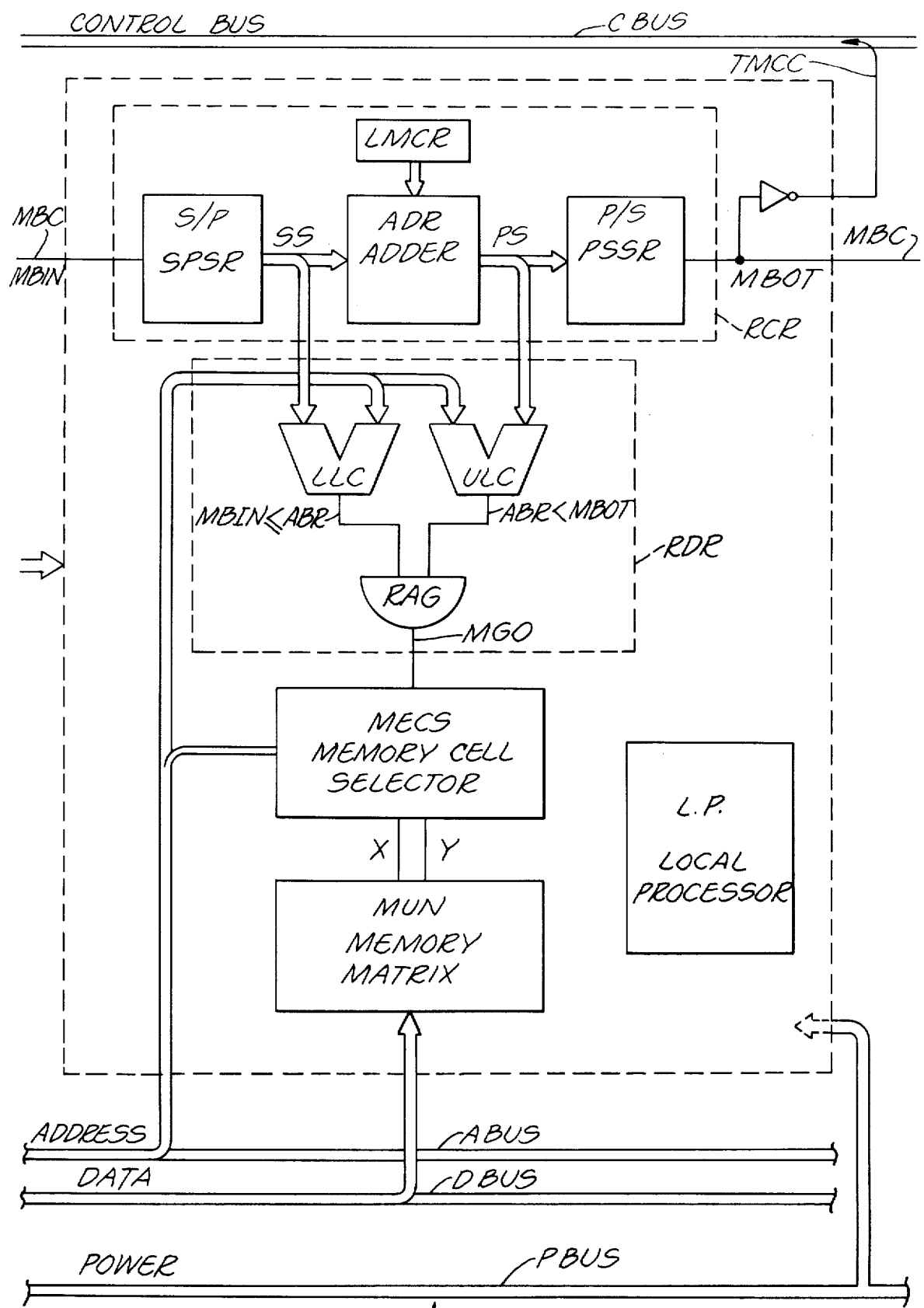
FIG. 3 is a block diagram of a memory module embodying features of the invention.
Figure 4:
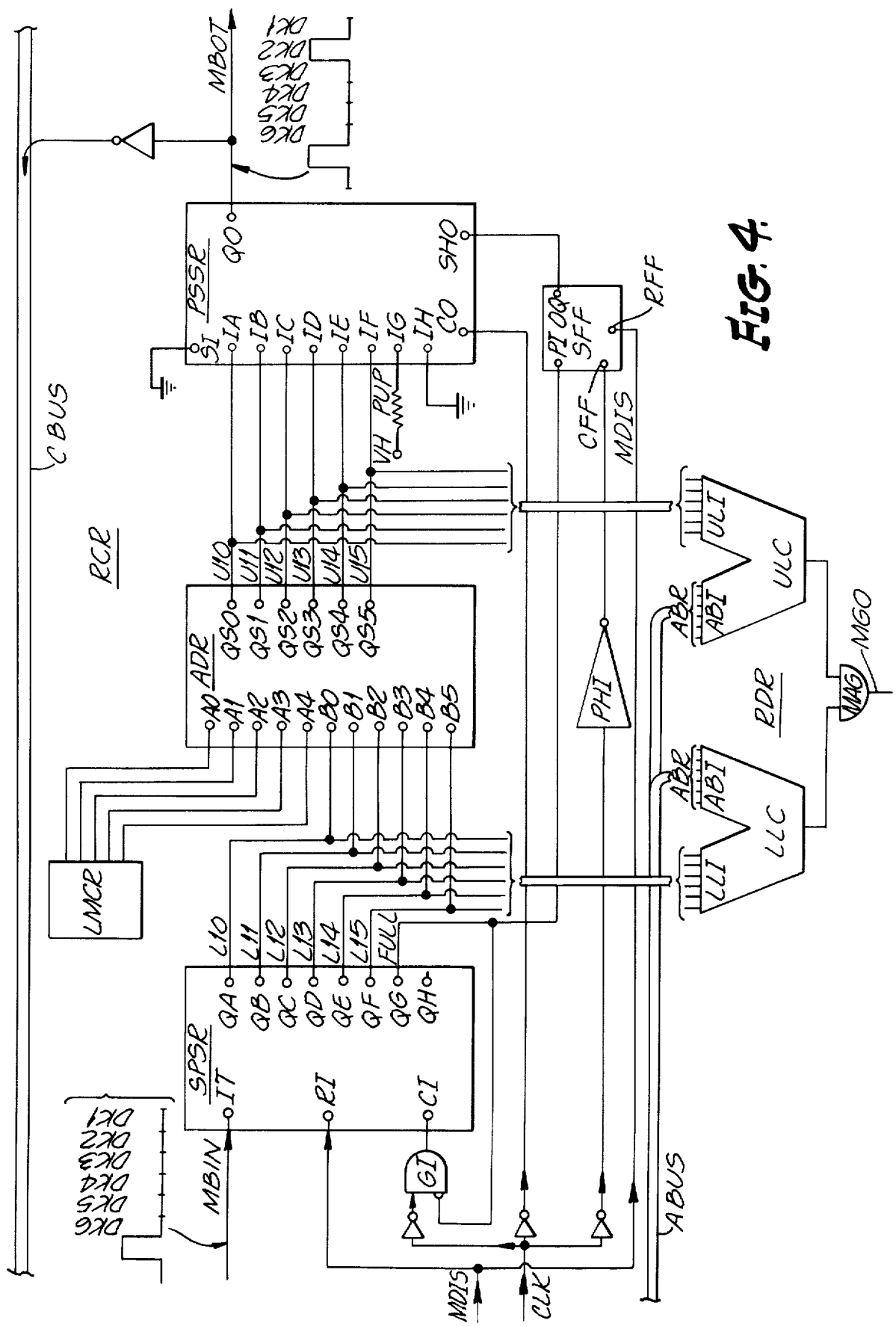
FIG. 4 is a partly schematic, partly block, diagram of a calculator and range detector employed in a memory module in order to implement the invention.

As indicated in FIGS. 3 and 4, each range calculator RCR includes a local memory capacity register LMCR, a serial-to-parallel shirt register SPSR, an adder ADR, and a parallel-to-serial shift register PSSR, as previously mentioned. The range detector RDR of each memory module is made up of a lower limit comparator LLC and an upper limit comparator ULC, also as previously mentioned.

Each local memory register LMCR acts as a source of a 5-bit signal AA14, AA13, AA12, AA11, AA10 representing the memory capacity of the local memory unit that is on the same module.

The serial-to-parallel shift register SPSR converts the signal MBIN supplied to the input of the range calculator RCR to convert it to a corresponding parallel signal that represents the lower limit L15, L14, L13, L12, L11, and L10 for that module at the output terminals QF, QE, QD, QC, QB, and QA of the serial-to-parallel register.

Automatic Range Limit Calculations

The manner in which the calculator signal MBIN is modified as it ripples through the four calculators RCR is represented in FIG. 8 where MBIN1, MBIN2, MBIN3, MBIN4, and MBTOT represent, in serial form, the calculator signal MBIN as it enters the first memory module, the second memory module, the third memory module, the fourth memory module, and the processor module respectively. As indicated on the left side of FIG. 8 under the legend LMC, it has been assumed that the memory units on the four memory modules have capacities LMC of 4K, 2K, 8K, and 2K respectively and that there is no memory unit on the processor module. The cumulative totals represented by the four output signals MBOT1, MBOT2, MBOT3, and MBTOT appearing at the output of the four modules respectively of 4K, 6K, 14K, and 16K are indicated under the heading MBOT. Accordingly, the foregoing signals define the boundaries of the memory modules and the memory modules respond only to the addresses in the ranges between those boundaries, that is, to address signals that lie in the ranges of the respective memory modules as set forth in Table III.

Important details concerning the construction and operation of the range calculators RCR and range detectors RDR are described below with reference to FIG. 4 which illustrates a practical embodiment of the invention in block and schematic form.

The serial-to-parallel shift register SPSR comprises an 8-stage shift register that has an input terminal IT for receiving the input signal MBIN in serial form, eight output terminals QA, QB, QC, QD, QE, QF, QG and a reset terminal RI, and a clock, or timing, signal terminal CI. The serial-to-parallel shift register is of a standard configuration including an 8-bit shift register, such as one of type SN74164 described at pages 334–338 of the TI Data Book.

The register SPSR reproduces the incoming range signal in parallel form on the six output terminals QA–QF and the signature of the calculation signal on the seventh output and eighth terminal QG and QH. The signal at the eighth output terminal is not used. Thus, the last stage of this 8-bit register is not actually used.

In operation, the input signal MBIN is converted from serial from to parallel form, appearing at the output terminals QH, QG, QF, QE, QD, QC, QB, QA of the serial-to-parallel register as 0, and 1 followed by a series of signals L15, L14, L13, L12, L11, and L10 corresponding to digits DK15, DK14, DK13, DK12, DK11, and DK10. The input range signal L15, ..., L10 represents the lower boundary of the module, and is applied in parallel to the lower level input LLI of the lower level comparator LLC.

A signal source LMCR for providing a digital signal corresponding to the capacity of a module is illustrated schematically in FIG. 5 in the form of a simple fixed register consisting of a plurality of switches SW1, SW2, SW3, SW5, SW5 for providing either 0-signals or 1-signals at the five outputs MD1, MD2, MD4, MD8, and MD16. The output signals are AA10, AA11, AA12, AA13, and AA14 respectively. The switches are of the single-pole, double-throw type, movable from one pole connected to the ground and to another pole connected to the 5V hang voltage VH. The switches normally are in the form of conductors etched on a printed circuit board together with jumpers for permanently interconnecting certain of the conductors. When any switch is in its zero or ground condition, a 0 voltage is applied to the corresponding output terminal MD. When it is in the 1, or high voltage, position, a 5V signal is applied to that terminal. A 1 in any position is the value of the digit that represents a part of the memory capacity in terms of the memory capacity base, which in this case is 1K. Thus, for example, if a 1-signal appears at only the output terminal MD4 and a 0-signal appears at the remaining output terminals, the memory capacity indicated is 00100K (binary) or 4K (decimal). Likewise, if 1-signals appear only at the two output terminals MD1 and MD2, the output signal is 00011K (binary), or 3K (decimal).

In the embodiment of the calculator illustrated in FIG. 4, the adder ADR is a 5-bit adder for receiving a 5-bit signal from the local memory capacity register LMCR and the 6-bit starting address signal from the output of the serial-to-parallel shift register SPSR.

The adder ADR is provided with two sets of input terminals. One set of input terminals A4, A3, A2, A1, A0. The memory capacity signal AA14, AA13, AA12, AA11, AA10 is applied to one set of input terminals A4, A3, A2, A1, A0 respectively of the adder. The lower limit signal L15, L14, L13, L12, L11, L10 appearing at the output terminals of the serial-to-parallel register SPSR are applied to another set of input terminals B5, B4, B3, B2, B1, B0 of the adder. The sum of the binary numbers represented by the two sets of signals is reproduced as a 6-bit binary number U15, U14, U13, U12, U11, U10 at the output terminals QS5, QS4, QS3, QS2, QS1, and QS0 of the adder ADR. This binary number defines the upper limit UL15, UL14, UL13, UL12, UL11, and UL10 of the module on which the adder ADR is located and the lower limit LL15, LL14, LL13, LL12, LL11, and LL10 of the next module.

The parallel-to-serial shift register converts the sum, or output boundary, signal U15, U14, U13, U12, U11, and U10 to serial form in a serial output signal MBOT for feeding to the input of the next module.

The adder may be composed of standard components, such as the 4-bit adder of Type SN7483 appearing at pages 190–200 of the TI Data Book and supplementary circuits connected in a conventional manner, extending the operation of the adder for handling 5-bit signals at the input and reproducing a 6-bit signal at the output.

In some cases, the construction of the range boundary calculator may be simplified by bypassing some of the addition features. For instance, if the memory module has a capacity of 4K, correct calculations can be achieved by modifying the adder ADR and otherwise modifying connections of the range computer RCR of that module, to eliminate some of the adding steps. Thus, for example, a 4K memory module may employ a range calculator RCR from which the terminals A0, A1, QS0, and QS1 and B0 and B1 have been eliminated provided that direct connections are made from the QA terminal to the IA terminal and from the QB terminal to the IB terminal.

The parallel-to-serial shift register PSSR has eight input terminals IA, IB, IC, ID, IE, IF, IG, and IH. The parallel-to-serial shift register PSSR operates to transfer the signals from the input terminals to the output terminal Q0 one at a time in the order IH, IG, IF, IE, ID, IC, IB, and IA, thus generating the output range boundary signal MBOT in serial form, when properly actuated. To this end, the parallel-to-serial shift register PSSR also includes a clock, or timing, signal terminal CO, and a shift signal terminal SHO. The parallel-to-serial shift register PSSR may be of the type SN74165 shown at pages 339–342 of the TI Data Book.

The signals U15, U14, U13, U12, U11, and U10 that appear at the terminals QS5, QS4, QS3, QS2, QS1, QS0 represent the upper boundary of the module. This 6-bit signal is applied to the upper limit input ULI of the upper limit comparator ULC.

Initialization of Calculators

Before the actual calculations occur in the range calculators RCR, various parts of the modules are energized and initialized. These operations include the following:

1. First power signals are applied to the serial-to-parallel shift register SPSR, the adder ADR, the parallel-to-serial shift register and a switching flip-flop SFF and to other components on the memory module as required, to energize all of these various components preparatory to operation.
2. Second, the hang voltage VH is applied to the input terminal IG of the parallel-to-serial register PSSR through a resistor produces a 1-signal at the seventh input terminal IG. In effect, a 1 is always applied to this input terminal IG.

The eighth terminal IH of the parallel-to-serial shift register PSSR is grounded, thus, in effect, applying a 0 to this input terminal.

While the memory enable signal MDIS is at its 0-level prior to rising to its 1 level, it applies a 0 signal to the reset input terminal RI of the serial-to-parallel shift register SPSR thus setting 0's in the output terminals QH, QG, QF, QE, QD, QC, QB, and QA and setting this register SPSR in its inactive state.

Also, when the memory enable symbol MDIS is 0, it is applied to the reset terminal RFF of the switch flip-flop unit SFF. In this condition, because of the appearance of a 0 signal at the terminal QG of the serial-to-parallel shift register SPSR, a 0-signal is applied to the input terminal PI of the switch flip-flop SFF thereby producing a 0-signal at its output terminal OQ. The latter 0-signal is applied to enable terminal SHO of the parallel-to-serial shift register PSSR, setting and holding this register in its inactive state. The particular flip-flop unit SFF that is employed is a Model SN7474, described at page 76 and pages 120–123 of the TI Data Book.

Synchronous clock signals CLK from the master clock MCL are supplied to each module over one of the conductors of the control bus CBUS. These signals are applied through buffer units to the clock terminals of the shift registers SPSR and PSSR and the switch flip-flop SFF.

More particularly, the clock signals are also applied through an AND gate GI to the clock terminal CI of the serial-to-parallel register SPSR. The seventh output terminal of the serial-to-parallel register SPSR is connected through an inverter to the AND gate GI. So long as a 0-signal appears at the terminal QG, the input AND gate GI remains open transmitting clock pulses to the clock input terminal CI.

When the serial-to-parallel shift register has previously been enabled by the application of the memory enable signal MDIS, the 0's registered in the output terminals QG, . . . , QA remain at 0 because of the fact that the input signal MBIN remains at a 0 level until the MDIS signal is switched to a 1 level starting the calculation.

An inverter PHI connected at the clock pulse input terminal CFF of the switching flip-flop SFF introduces a delay between the shutting off of the serial-to-parallel shift register SPSR and the switching of the flip-flop SFF. This delay plus the inherent delay introduced by the operation of the flip-flop switch SFF together delay the application of a shift pulse to the shift terminal SHO at the parallel-to-serial shift register PSSR until after the addition operation performed by the adder ADR has been completed. This delay is about one-half of a clock cycle; but it may be made larger if desired by utilizing a suitable delay unit in the line connecting the output of the flip-flop SFF and the shift terminal SHO of the output shift register.

In the initial condition prior to switching of the memory module signal MDIS to its 1 value, 0's appearing at all the output terminals of the serial-to-parallel shift register SPSR are impressed on the input terminals B5, . . . , B0 of the adder ADR at that time. The local memory capacity LMC, which is impressed on the input terminals A1, A2, A3, and A4 of the adder ADR, is reproduced at the output terminals, thus producing a pseudo-or spurious upper limit at the output of the adder. In this state, even the repeated application of clock signals to the clock input terminal CI have no effect on the output of the serial-to-parallel shift register SPSR because only 0-signals are shifted from one output terminal to another. Likewise, so long as the signal from the seventh output terminal QG of the serial-to-parallel register SPSR remains 0, the switch flip-flop SFF maintains a 0-signal at the shift terminal SHO and the parallel-to-serial shift register PSSR remains inactive.

At this stage of operations, all of the memory modules are in the same condition, namely, with the signals in all their serial-to-parallel registers SPSR, adders ADR, and parallel-to-serial shift registers PSSR, and switch flip-flops SFF the same, except for the differences representing the local memory capacities of the respective modules.

Thereupon, when the range calculation starting signal MDIS is switched to its 1 level, the starting address signal MBIN1 is transmitted to the first module.

Range Calculating Process

The starting signal MBIN1 is supplied in serial form to the input terminal IT of the first memory module. Concurrently, the application of clock signals to the clocking terminal CI causes the signals in the various time slots of the boundary signal MBIN1 to be applied consecutively and to be shifted consecutively from the first output terminal QA to the other output terminals in sequence. When the signal in the second time slot TSG appears at the seventh output terminal QG, a 1 signal called FULL appears at the seventh output terminal. The creation of the FULL signal shuts off the operation of the serial-to-parallel shift register SPSR by virtue of its action on the input AND gate GI and actuates the switch flip-flop SFF.

The signals appearing at the output terminals L15, . . . , L10 that are developed during the shifting of signals in the shift register SPSR, and the sum U15, . . . , U10 appearing at the output of the adder ADR, are spurious until the FULL signal is developed by the shift register.

When the FULL signal is applied to the input AND gate GI, the transmission of further clock signals to the clocking input CI is inhibited. This results in a holding of the input signal MBIN1 in parallel form on the output terminals QA, . . . , QG. The output signals L15, L14, L13, L12, L11, and L10 appearing at the output terminals of the serial-to-parallel shift register SPSR are applied to the input terminals B5, . . . , B0 of the adder ADR, as previously described. The sum of the two digital signals produced by the adder ADR, namely, the upper limit signal U15, U14, U13, U12, U11, and U10 is applied to the input terminal IF, IE, ID, IC, IB, and IA of the parallel-to-serial shift register. Accordingly, when the FULL signal is developed, the signals appearing in the outputs of the shift register SPSR and the adder ADR attain their operative values and remain fixed.

After a short time delay of half a clock cycle subsequent to the termination of the FULL signal, the clock signal applied to its clock input CFF switches the value of the signal at the output OQ of the flip-flop unit SFF from 0 to 1, thereby enabling the parallel-to-serial shift register PSSR. The delay in switching is determined, in part, by the inverter PHI. When such enabling occurs, the parallel digital signal appearing at the input of the parallel-to-serial shift register is transferred to shift elements within the output register PSSR and is then shifted out, converting the upper boundary calculator signal MBOT from parallel form to serial form.

The output shift register remains enabled after the 8-bit calculator signal has been shifted out of it. As a result, the 0 signals that enter serially into the shift elements through the serial input terminal SI are continually shifted out through the output terminal QO, but they have no effect since they are all at 0 level. A ground connection at the serial input terminal SI assures the inputting of 0 signals behind the signals that are shifted out from the eight parallel input terminals. It is to be noted that while the 0 level signals are being continuously shifted out, the signals applied to the input terminals IH, . . . , IA remain unchanged.

As signals stored in the input terminals IA–IH are shifted one at a time to the output terminal QO, it is to be noted that the 0-signal represented by the grounding of the eighth input terminal IH and the 1-signal stored in the seventh input terminal IG provide the 2-bit signature component and the other signals registered in the input terminals IF, IE, ID, IC, IB, and IA provide the 6-bit address component UL15, UL14, UL13, UL12, UL11, and UL10 of the 8-bit output calculator signal MBOT. These signals form the 6-bit address component LL15, LL14, LL13, LL12, LL11, and LL10 of the input calculator signal MBIN of the next module.

The output signal MBOT of each module becomes the input signal for the next module in series. As the input signals MBIN are applied consecutively to the modules, the upper and lower boundaries of the various modules are calculated and the range detectors are set so that each memory unit will respond only to an address signal within the range of that memory unit.

When the output signal MBOT appears at the output of each of the memory modules it is applied through a buffer and through the conductor TMCC of the control bus to the total memory capacity register TMCR in the processor. As the signals MBOT appear at the outputs of the succesive modules, they override signals previously stored in the total memory capacity register TMCR so that when the calculation produced by the various range calculators RCR has been completed, a total capacity representing the sum of the capacities of the memory units on all the modules is stored in the total memory capacity register TMCR.

Initial Starting Address

Where a memory unit MUNP is installed in the processor and is used as part of the memory bank, the starting capacity, which represents the capacity of that memory unit, may be set in a local memory capacity register LMCRP and the output applied directly to a parallel-to-serial shift register PSSRP as indicated in FIG. 6. If, indeed, no memory unit is included in the processor, the switches of the local memory capacity register LMCRP are all set at 0, thus providing a 0 starting address.

The output of the local memory capacity register LMCRP on the processor is also applied to the upper terminals of an upper limit comparator ULCP so that the range component of any memory address signal can be tested in order to enable the memory cell selector of that memory unit on the processor only if the address lies within the range of that memory unit. In this connection, it will be understood, of course, that since the address signals are all positive, it is not necessary to employ a lower limit comparator to determine whether the address provided by an instruction lies below the lower limit (0) of the range of the memory unit that is on the processor module. Likewise, of course, a similar arrangement could be employed on the first memory module of the memory bank if there is no memory unit on the processor. However, this is not done since it is more practical to utilize memory modules having both lower limit comparators and upper limit comparators as indicated in FIGS. 3 and 4, so that all pure memory modules are interchangeable. Thus, a standard memory module may be inserted in any arbitrary position in the sequence of memory modules that are connected in the minicomputer.

At the time a memory subunit MSU is installed on the processor module, its capacity is set in the register LMCRP so that when calculations are initiated, a signal MBIN1 representing the memory capacity of the memory subunit MSU is supplied to the first module instead of the 0 signal previously described. The starting address of the first module is 1 more than the ending address of the memory subunit MSU. In such a case, the memory addresses at the boundaries of the modules are all increased by an amount equal to the memory capacity of the memory subunit MSU. Thus, if a 1K memory subunit MSU is installed on the processor, all of the calculator signals shown in FIG. 8 are modified by adding a 1 signal in the time slot TSA and increasing in the addresses at the boundaries shown there by 1K. The foregoing explanation recognizes that at any time the configuration of the memory bank is changed, the system is restarted by turning on the power.

Range Detection

The upper and lower boundaries are thus established for all of the memory modules, thereby preparing the range detectors RDR for operation. Thereafter, after the processor is enabled and a suitable execution signal is applied to the processor, the memory modules proceed to respond to the various address control and data signals transmitted to them by the processor so that the memory bank acts as if it were a single memory system having a total memory capacity equal to the sum of the capacities of all of the memory units and with the addresses of all the memory cells consecutively numbered and without gaps or overlap in the overall range of the addresses.

Both the lower limit comparator LLC and the upper limit comparator ULC are made up of two comparators of the type 7485 illustrated at pages 202–205 of the TI Data Book. The 6-digit lower level signals L15, L14, L13, L12, L11, and L10 are applied to the lower level input of the lower level comparator LLC, and the 6-digit upper level signals U15, U14, U13, U12, U11, and U10 are applied to the upper level input of the upper limit comparator ULC, as previously explained.

When the central processor CPU has been enabled to execute, the 6-digit range component of the address signal is applied to the upper level input ULI of the lower limit comparator LLC and to the low level input LLI of the upper limit comparator ULC. The lower limit comparator is connected to produce a 1 or true-signal at its output when the range component of the address is equal to or is greater than the lower limit; and the upper level comparator is connected to produce a 1 or true-signal at its output only when the range component ABR of the address signal is less than the upper limit. Thus, these two signal are applied to the input legs of an AND gate so that a true signal MGO is produced at the output of the AND gate if and only if the range component of the address lies within the address range of the corresponding module. In other words, a true signal appears at the output of the comparator if and only if the following relation is satisfied:

$$LL \leq ABR < UL$$

where
LL = starting address for the module
UL-1 = ending address for the module.

When a true MGO signal appears at the output of a range AND gate RAG, the memory unit MUN on the corresponding memory module is enabled, so that an appropriate memory cell in that memory unit is accessed in accordance with the absolute address in the instructions supplied from the central processor CPU.

Inasmuch as all the memory units have address ranges that form a continuous overall range of integral addresses, the bank of memory units appear to the central processor the same as a single memory unit having the same total capacity as the sum of the capacities of the memory units. Thus, the memory unit of only one memory module at a time is enabled, all the other memory units being inhibited. Furthermore, for reasons previously explained, if the address in the instruction lies at or above the upper boundary of the bank of memory units, all the memory units remain inhibited, and a signal indicating that the address is out of bounds, is produced on the console of the computer.

Implementation

In the practice of this invention, the various modules referred to are assembled on separate printed circuit boards PCB of standard size, and are assembled in a cabinet. The memory modules and the processor modules are all assembled on printed circuit boards having standard arrangements of male contacts along the same edge As illustrated in FIG. 9, a computer cabinet CCAB is provided with a vertical mother board MTB carrying a bank of linear connectors extending horizontally from one side wall thereof to the other. The printed circuit boards PCB of the processor module PRM, the memory modules MOD, and the power supply module are slid into the cabinet from the rear in grooves between pairs of lateral supporting rails or flanges. Each connector comprises a plurality of pairs of female contacts which are mated by pairs of male contacts bonded to the surfaces of the respective printed circuit boards along one edge thereof.

One of the linear connectors SKP is dedicated to receiving the procesor board. Another SKPS is dedicated to receiving the power supply board. And the remaining connectors SMK1, SKM2, . . . , are available to receive memory modules or interface module.

In this particular case, an interface unit mounted on the processor module carries a connector at its rear for connection to a cable CPR which communicates with the peripheral units PER1 and PER2.

The various controls and indicator lights that are located on the console communicate with the mother board connector SKC. And the terminals of the various connectors are interconnected by wiring in order to facilitate appropriate communications between the modules and thus, in effect, to provide parts of the various buses, namely, the address bus ABUS, the control bus CBUS, the data bus DBUS, and the power bus PBUS, as required.

Various units, or building blocks, are assembled on the respective printed circuit boards and they are interconnected in conventional manner by means of conductors that are photo-etched, or otherwise, bonded to the boards to provide the various interconnections required, all in accordance with methods well known in the art.

The computer console itself, comprises various switching elements for controlling or interrupting or initiating various operations in the computer, and also various signal lights for indicating the status of operations. Thus, the console is provided with a power-on indicator light LON that is energized when the AC power is turned on, and a LRUN light responding to a change of the BISEN signal from 0 to 1 and a start signal from the start switch, to indicate that the processor has been enabled and is running, and an out-of-bounds light LOB controlled by the total address comparator TRD to indicate that an instruction address lies beyond the upper boundary of the bank of memory modules. The console is also provided with an array of 16 lights to display the contents of various registers, and pushbutton switches BSW for changing those contents. A switch LDSW is also provided to set the computer in a loading mode or a display mode. A set of switches RSWA, RSWB, RSWC, RW1 and RW2 establish communication between the console and the registers PREGA, PREGB, PREGC, INST1, or INST2 respectively. These switches are employed for selecting any one of these registers for access from the console. Operation of the switch LDSW determines whether the register is to be accessed to read the contents of the register or is accessed in order to change those contents. When the switch LDSW is in the load mode actuation of the pushbutton switches BSW causes a 1 or a 0 to be applied to a respective element of a selected register. When it is in the display mode, the lights indicate the contents of the elements of the selected register.

In practice, the various connectors and the corresponding types of boards to which they are dedicated, are keyed, in order to assure that various types of boards are inserted into corresponding dedicated connectors. It is to be noted, however, that all of the memory boards and memory connectors are keyed alike so that they are interchangeable.

Variations

The foregoing description sets forth only sufficient details to enable a person skilled in the art to make and use the invention and describes the best mode now contemplated for practicing the invention. Such details of design, construction and assembly have been omitted since they are well known in the art.

For the most part, the invention has been described with reference to particular types of logic units, such as AND gates. Other equivalent arrangements may be employed, such as NAND gates in accordance with well-known principles.

Through the invention has been described with reference to a computer which is based upon the use of signals representing binary digits, it will be understood that the invention is also applicable to signals based upon other digit systems, such as a digit system having a trinary or other non-binary base.

The invention, of course, is not limited in its application to memory units of the type specifically described. Thus, the invention is applicable to memory units employing other types of memory cells than sets of magnetic cores.

The invention is also readily adapted for use with memory banks in which two or more memory modules are interleaved. For example, where the memory bank includes a pair of interleaved modules of equal capacity, the memory cell selectors may be of a type which selects one module of the pair when the absolute address is an odd number, and the other module of that pair when the absolute address is an even number, all as is well known to those skilled in the art.

It will be understood, therefore, that the invention may be practiced in many ways other than those specifically described, and may be implemented in many different ways, both electrically and mechanically, without departing from the scope of the invention. The invention claimed is:

1. In a digital computer having a processing unit and a system for selectively addressing individual memory cells of a memory bank having a series of separate memory units, each said memory unit containing a number of such memory cells, for storing information in or for reading out information from each cell in accordance with a corresponding selectable absolute adress signal generated by said processing unit to represent the absolute address thereof corresponding to said each cell, the combination of:

a plurality of signal sources for providing signals representative of the number of memory cells in the respective memory units, said signal sources being associated with said memory units on a one-to-one basis;

starting address means for establishing a fixed starting address for the first memory unit in the series and for generating a signal representing said starting address;

a plurality of calculating means associated with said memory units on a one-to-one basis, each such calculating means being controlled by the signal source of the associated memory unit and in accordance with a starting address signal of the associated memory unit for establishing a unique ending address for said associated memory unit, and for generating a signal representing said unique ending address, each such calculating means but the last also being controlled by the signal source of the corresponding memory unit and in accordance with the starting address signal of the associated memory unit for establishing a starting address for the next memory unit in the series, whereby a local address range is established for each said memory unit, and the absolute address is established for each cell in each said memory unit; and a plurality of range detectors associated with said memory units on a one-to-one basis, each such range detector being responsive to a signal generated by said processing unit to represent a selected absolute address and also responsive to the starting and ending address signals of the associated memory unit, for enabling said memory unit to select a memory cell corresponding to said selected address only when said selected absolute address lies within the local address range of said memory unit.

2. In a digital computer having a processing unit and a system for selectively addressing individual memory cells of a memory bank having a series of separate memory units, each said memory unit containing a number of such memory cells, for storing information in or for reading out information from each cell in accordance with a corresponding selectable absolute address signal generated by said processing unit to represent an absolute address, the combination of:

a corresponding series of memory capacity signal sources associated on a one-to-one basis with the respective memory units for supplying a digital signal representing the memory cell capacity of each respective memory unit;

starting address means for establishing an initial fixed start address for the first memory unit in the series, means associated with each said memory unit for storing a starting address and for generating a signal representing said starting address;

means controlled by the signal source associated with each memory unit that is followed by another unit and controlled by the starting address signal for said each memory unit for establishing a unique ending address for said each memory unit and a unique starting address for the next following memory unit in the series in accordance with said starting address signal of said memory unit and the memory capacity of said each memory unit, for generating signals representing said unique starting and ending addresses whereby a local address range is established for each said memory unit and the absolute address is established for each cell in the respective memory units;

and a plurality of range detectors associated with said memory units on a one-to-one basis, each such range detector being controlled in accordance with a selected absolute address signal and in accordance with the starting and ending address signals of the memory unit with which it is associated, for enabling said each memory unit to select a memory cell corresponding to said selected address only when said selected absolute address lies within the local range of said each memory unit.

3. In a digital computer as set forth in claim 2 wherein the ending address of each said memory unit but the last is 1 less than the starting address of the next following memory unit in the series.

4. In a digital computer as set forth in claim 3, an auxiliary memory unit having a number of memory cells, said starting address means establishing an ending address for said auxiliary memory unit 1 less than the memory capacity thereof; and an auxiliary range detector controlled in accordance with said selected absolute address signal for enabling said auxiliary memory unit only when the selected absolute address is less than said initial starting address.

5. In a digital computer as set forth in claim 3, means for establishing an upper boundary address 1 greater than the ending address of the last memory unit in the series and for generating a signal representing said upper boundary address;

comparator means controlled in accordance with said upper boundary address signal for detecting whether the absolute address lies above the ending address of said last memory unit, and means for inhibiting the selection of any of said memory cells if the absolute address lies above said last mentioned ending address.

6. In a digital computer as set forth in claim 3, means for establishing an upper boundary address 1 greater than the ending address of the last memory unit in the series and for generating a signal representing said upper boundary address;

comparator means controlled in accordance with said upper boundary address signal for detecting whether the absolute address lies above the ending address of said last memory unit, and means for enabling selection of a memory cell only if the absolute address lies below said upper boundary address.

7. In a digital computer having a processing unit and a system for selectively addressing individual memory cells for a memory bank having a plurality of separate memory units, each said memory unit containing a number of memory cells, for storing information in or for reading information from such cells in accordance with a corresponding selectable absolute address signal generated by said processing unit to represent an absolute address, the combination of:
- a plurality of memory capacity signal sources associated with said memory units on a one-to-one basis, each signal source supplying a signal representing the memory cell capacity of the memory unit with respect to which said last mentioned signal source is associated;
- an auxiliary signal source for establishing an initial digital starting address;
- range setting means controlled by said plurality of said signal sources for establishing a unique fixed digital starting address for each individual memory unit
- and for establishing a unique fixed ending address for each individual memory unit in accordance with said unique starting address and the memory capacity of said each individual memory unit, and for generating signals representing said starting and ending addresses respectively;
- and a plurality of range detectors associated with said memory units on a one-to-one basis, each such range detector being controlled in accordance with a selected absolute address signal and in accordance with the starting and ending address signals of the associated memory unit, for enabling said individual memory unit to select a memory cell therein corresponding to said selected absolute address only when said selected absolute address lies within the local range of the associated memory unit.

8. In a digital computer having a processing unit and a system for selectively addressing individual memory cells of a memory bank having a series of separate memory units, each memory unit of the series containing a number of such memory cells, for storing information in or for reading information out of each cell in accordance with a corresponding selectable absolute address signal generated by the processing unit to represent an absolute address, the combination of:
- a corresponding series of memory capacity signal sources, one such signal source within each respective memory unit for supplying a digital signal representing the memory cell capacity of said each respective memory unit;
- starting address means for establishing an initial fixed starting address for the first memory unit in the series and for generating a signal representing said initial fixed starting address;
- means associated with each said memory unit for storing a starting address signal representing the starting address of said each memory unit;
- means controlled by said memory capacity signal source and said initial starting address signal for said first memory unit for establishing a starting address for each remaining memory unit and for establishing an ending address for each memory unit in accordance with said initial starting address signal of said first memory unit and the memory capacities of the prior memory units in the series, and for also establishing a total of the capacities, the range of addresses of each memory unit but the last, extending from said starting address for each memory unit to said ending address for each memory unit, each such ending address being 1 less than the starting address of the next memory unit in the series, and the ending address for one memory unit being 1 less than the aforesaid total,
- said controlled means including means for generating signals representing ending addresses respectively for each memory unit, and
- a plurality of range detectors associated with said memory units on a one-to-one basis, each such range detector being controlled in accordance with a selected absolute address signal and in accordance with the starting and ending address signals of the memory unit with which it is associated, for enabling said associated memory unit to select a memory cell corresponding to said selected absolute address only when said selected absolute address lies within the local range of said associated memory unit.

9. In a digital computer as set forth in claim 8, an auxiliary memory unit having a number of cells,
- said starting address means establishing a fixed ending address for said auxiliary memory unit 1 less than the memory capacity thereof; and
- an auxiliary range detector controlled in accordance with said selected absolute address signal for enabling said auxiliary memory unit only when the selected absolute address is less than said initial starting address.

10. In a digital computer as set forth in claim 9,
- means for establishing an upper boundary addres 1 greater than the ending address of the last memory unit in the series and for generating a signal representing said upper boundary address,
- comparator means controlled in accordance with said upper boundary address signal for detecting whether the selected absolute address lies above the ending address of said last memory unit, and
- means for enabling selection of a memory cell only if the selected absolute address lies below said upper boundary address.

11. In an information processing system including a plural memory system; and a memory control unit for supplying address signals for addressing corresponding individual memory cells in such memory system for selectively storing information therein or for reading information therefrom in which said memory cells are assigned a series of ordinal symbols to specify their locations, and wherein said plural memory system comprises a series of memory modules,
- each memory module comprising
    - a memory unit having a plurality of said memory cells, the number of memory cells in each memory module being an integral multiple of an integral base number, and
    - an address range detector corresponding to said module for detecting whether a selected address signal received from such processing system lies within the ordinal range of said module whereby a detected address signal from said processing system actuates a cell in said module only when the cell addressed has an address that lies within the range of said module; the improvement comprising:
- range setting means comprising a capacity signal source in each respective module for generating a signal representing the memory capacity of the memory unit of said each respective module, and
- means coupling the address range detectors of successive memory modules in the series and jointly controlled by signals generated in said capacity signal sources for rendering the address range detector corresponding to each memory module responsive only to address signals having addresses within the range of addresses appropriate to each memory module.

12. In an information processing system as defined in claim 11,
a total installed memory system controlled by the range setting means of said memory modules for establishing a total installed memory capacity representing the sum of the ranges of said series of memory modules; and
memory enabling means responsive to said selected address signal for enabling said memory modules only when said selected address signal represents an address within said total range.

13. In a memory system having installed therein a series of individual memory modules, each memory module having a plurality of individual memory cells,
address generating means for assigning a numerical address to respective memory cells in said memory modules, comprising:
a signal generator for generating an initial fixed starting address signal for establishing a lower boundary address in a first module;
a register in each of said modules for providing a memory capacity signal representing the number of memory cells in the module in which said register is located;
receiving means in each module for receiving and holding a lower boundary address signal for the module in which said receiving means is located;
adder means in each module for combining the lower boundary address signal of that module and the memory capacity signal from the register in that module and holding the sum forming the upper boundary address of that module;
and means for supplying the upper boundary address of each module but the last to the receiving means of the next following module to form the starting address thereof.

14. In a memory system,
memory address boundary calculating and storing means comprising:
lower address boundary receiving means for receiving a digital lower address boundary signal defining the fixed lower boundary address of a group of memory cells in a memory unit;
a local memory capacity register within said memory unit for providing a digital memory capacity signal representing the number of memory cells in said memory unit;
adding means in circuit with said lower boundary receiving means and with said local memory cell register for summing said lower boundary address signal and said memory capacity signal to produce a signal that represents a digital upper address boundary for said module; and
means for receiving a selectable digital absolute address signal that has more digits than said memory capacity signal, said selectable absolute address signal having a range component and a local address component that are partially non-overlapping; and
means controlled by the range component of said absolute address signal and said stored boundary address signals for generating a signal to provide access to memory cells corresponding to the local address component of said absolute address signal only when said absolute address signal lies within a range defined by said boundaries.

15. In a memory system as defined in claim 14,
said lower address boundary receiving means comprising a serial-to-parallel shift register.

16. In a memory system as defined in claim 15, wherein said adder means generates said upper address boundary signal in parallel form,
a parallel-to-serial shift register for converting said upper address signal boundary from parallel to serial form.

17. In a modular memory system for a digital computer,
a series of memory address boundary calculating and storing means associated with a series of ordered memory units on a one-to-one basis, each such means and each such memory unit having an input and an output respectively and each such means comprising:
lower address boundary signal receiving and converting means for receiving a digital signal in serial form, said digital signal defining the fixed lower boundary address of a group of memory cells in the corresponding memory unit and for converting said digital signal to parallel form;
a local memory capacity register for providing a digital memory capacity signal representing the number of memory cells in said corresponding memory unit;
adding means in circuit with said lower boundary signal receiving means and with said local memory capacity register for summing said lower address boundary signal and said memory capacity signal to generate a digital upper address boundary signal for said memory unit; and
means for converting said upper boundary signal from parallel form to serial form and applying it to the output of said boundary calculating and storage means;
means for connecting the output of each but the last of said calculating and storing means to the input of the next in series;
means for supplying an initial starting address signal to the input of the first memory unit in said series of memory units;
means for receiving and storing the upper boundary address signal of the last memory unit in said series,
means in each said memory unit for receiving a selectable digital absolute address signal that has more digits than the memory capacity signals for the respective memory units;
said absolute address signal having a range component and a local address component that are partially non-overlapping; and
means controlled by the range component of said absolute address signal and said stored boundary address signals for generating a signal for enabling a memory unit with the local address component of said absolute address signal only when said absolute address signal lies within a range defined by the boundaries of said last mentioned memory unit.

18. A memory module having a number of memory cells for use in a minicomputer system, comprising:
a signal source on said module for generating a memory capacity signal representative of said number of memory cells;

means for receiving an external boundary defining signal;

range calculating means controlled by said memory capacity signal and said boundary defining signal for setting and storing fixed upper and lower boundary addresses in said module, the range between said upper and lower boundary addresses being determined by the memory capacity of said module; and range detecting means for comparing a received selectable address with said upper and lower address boundaries and to generate a memory cell selector enabling signal when said received selectable address lies between said upper and lower address boundaries.

19. In a memory controlling module for controlling a memory unit having a number of memory cells, said module having an input and an output, range calculating means for setting and storing fixed upper and lower boundary addresses in said module, the range between said upper and lower boundary addresses being determined by the memory capacity of said unit, lower boundary address receiving means for receiving a digital boundary-defining signal in serial form at said input for defining a lower boundary address for said module;

a serial-to-parallel shift register for converting said lower boundary address signal from serial form to parallel form;

a local memory capacity register for to providing a digital memory capacity signal defining the number of memory cells in said memory unit;

adding means for combining said lower boundary signal in parallel form with said memory capacity signal to define a digital upper boundary address signal for said module;

means for storing said lower boundary address signal in parallel form;

means for storing said upper boundary address signal in parallel form;

range detecting means for comparing a received address signal with said upper and lower boundary address signals, and for generating a memory cell selector enabling signal only when the address of said received signal lies between said upper and lower address boundaries.

20. In a memory controlling module as defined in claim 19;

means for receiving a selectable digital absolute address signal that has more digits than said memory capacity signal, said absolute address signal having a range component and a local address component that are partially non-overlapping;

means controlled by the range component of said absolute address signal and said stored boundary address signals for generating said enabling signal for permitting access to memory cells corresponding to the local address component of said absolute address signal only when said absolute address signal lies within a range defined by said boundaries.

21. In an information processing system comprising a plural memory system; and a processing unit for addressing individual memory cells in such system for selectively storing information therein or for reading information therefrom and in which said memory cells are assigned a series of ordinal symbols to specify their locations, and wherein said memory system comprises a series of memory modules, each memory module comprising:

a memory unit having a plurality of memory cells, the number of memory cells in each memory module being an integral multiple of an integral base number, an address range detector for detecting whether a selectable address signal received from said processing unit lies within the ordinal range of said module whereby said selectable address signal from said processing unit actuates a cell in said module only when the cell addressed lies within the range of said module, and range setting means comprising a range signal source for generating a signal representing the memory capacity of said memory module;

said memory system also comprising means coupling the range setting means of successive memory modules in the series and controlled by signals supplied by said range signal sources for rendering the address range detector corresponding to each memory module responsive only to addresses signals having addresses within range appropriate to each memory module.

22. In an information processing system as defined in claim 21, an auxiliary range detector controlled by the range setting means of said memory modules for establishing a total range for said latter detector representing the sum of the ranges of said series of memory modules; and memory enabling means responsive to said selectable address signal for enabling said memory modules only when said address signal represents a selected address within said total range.

23. In an information processing system including a central processing unit and a plural memory system:

a plurality of memory modules connected to form a memory bank for accessing by a selectable absolute address signal supplied by said processor, each memory module having a memory unit having a number of memory cells and fixed starting and ending addresses and also having a memory range control unit;

a memory capacity register in each module for establishing the range between said fixed starting address and said fixed ending address for cells in the memory unit associated with said module;

power supply means for providing operating voltages to the central processing unit and each memory module and for supplying a hang voltage after being energized;

a start signal generator connected to said power supply means and actuated by said hang voltage;

means connecting said start signal generator to said memory control units to set said memory control units in an initial starting condition;

a starting address generator controlled by said start signal generator, after said initial starting condition has been established, to generate a signal representing a lower boundary address and to apply said lower boundary address to one of said memory modules; and means controlled by said starting address signal and the memory capacity registers for establishing an upper boundary address for said one memory module and lower and upper boundary addresses for the memory units on the respective remaining modules with the address ranges of the modules contiguous and free of overlap thereby establishing a continuous range of integral absolute addresses for the memory bank formed by said memory units.

24. In a method for addressing individual memory cells for selectively storing information therein or for reading out selected information therefrom, the steps of:
providing a series of individual memory modules, each containing a number of such memory cells;
creating in said memory module a memory capacity signal representing the number of memory cells in the memory module;
combining the memory capacity signals corresponding to memory modules prior to each memory module but the first in the series, to provide a signal representing the sum of the memory capacities of said prior modules,
registering a numerical starting address for each memory module to designate a first memory cell address therein in accordance with the sum signal corresponding to prior modules in the series; and
combining the memory capacity signal of each module with the numerical starting address of each module to establish an ending address for each memory module.

25. In the method for addressing individual memory cells set forth in claim 24, wherein the number of memory cells in each module is equal to the range between starting and ending addresses;
allocating to each memory cell an individual address number.

26. In the method for addressing individual memory cells set forth in claim 25, wherein the address range of each of said module lies between lower and upper boundaries;
presenting a desired memory cell address signal to a module;
comparing said desired memory cell address signal with signals representing the starting and ending addresses of said module;
granting access to a memory cell in said module if said memory cell address lies within the address range of said module, and
denying access to said memory cells on said module when said memory cell address lies outside the address range of said module.

27. In the method for addressing individual memory cells set forth in claim 25, wherein the address range of each of said modules lies between lower and upper boundaries;
presenting a desired memory cell address to each of said modules,
determining the address range with which said desired memory cell address lies;
selecting the module having the address range that includes the desired memory cell address; and
granting access to the addressed memory cell in said selected module.

28. In a modular data processing system:
a mother board having a plurality of multiple contact connectors adapted to cooperate with edge contacts on printed circuit boards;
a plurality of memory modules, each of said plurality of memory modules comprising a printed circuit board having edge contacts adapted to removably cooperate with a corresponding plurality of multi-contact connectors on said mother board, each memory module comprising:
a range calculator having an input and an output and having a memory capacity register for determining the range of addresses of memory cells in said module; and
an address range detector for determining whether a received address is within the range of addresses of that memory module;
and means on said mother board interconnecting contacts on said connectors to connect the output of one range calculator to the input of another range calculator.

29. In the modular data processing system as set forth in claim 28,
a processor module comprising a printed circuit board having edge contacts adapted to removably cooperate with a multi-contact connector on said mother board;
a starting system on said processor module;
means connecting said starting system to the input of a first range calculator to establish a starting address in a first module of said plurality of modules;
and means in said calculators for establishing boundary addresses in successive modules whereby the address ranges of successive modules are contiguous and free to overlap.

30. In a memory system for a digital computer having a series of successively ordered memory modules, address boundary allocation means comprising:
a local memory capacity register in each said memory module, for storing a representation of the memory capacity of said each module, the first module of said series having a predetermined value for its starting address boundary; and
an electrical means interconnecting said successive modules, each said module in the series but the first being responsive to said local memory capacity registers of all prior modules in the series, for automatically establishing a unique starting address boundary for said each memory module.

31. In a memory system for a digital computer as defined in claim 30, said address boundary allocation means further comprising:
activation means for activating said memory system; and
means responsive to said activation means for setting the starting address boundary of the first memory module of the series to said predetermined value and for establishing unique and sequential address boundaries for the remaining memory modules in said series.

32. In an improved memory system for digital computers, a serial array of memory modules comprising:
automatic address boundary setting means in each memory module for establishing fixed beginning and ending addresses of said each memory module to be unique and to be contiguous to the like addresses of adjacent memory modules in said serial array;
said address boundary setting means being interconnected when said modules are in said array whereby they are automatically responsive to the replacement of one module in the array by a replacement module having a different memory capacity for correctly setting said beginning and ending addresses of the replacement module and of each succeeding module in the array.

33. In an improved memory system for digital computers having a plurality of memory units, each having a plurality of addressable memory cells located therein; and each having an automatic memory address boundary defining means comprising:
  lower address boundary means for defining the lower boundary address of each said memory unit and for registering said addresses as respective digital signals;
  memory unit capacity means in each respective memory unit for representing the memory capacity of each said respective memory unit and for registering said capacity as a respective digital signal; and
  upper address boundary means for summing selected ones of said lower boundary address signals and selected ones of said memory unit capacity signals to determine an upper boundary address signal and for registering said upper boundary address for each said respective memory unit;
  means for presenting a desired memory cell address signal to all said memory units for either writing information into said cells or reading information out from said cells; and
  means in the respective memory units for granting access to a memory cell in a particular memory unit only if said desired memory cell address signal lies within the upper and lower address boundaries of the said particular memory unit in which said memory cell address is located.

34. in a method for addressing individual memory cells for the selective placement or sensing of information therein, the steps of:
  providing a serial array of individual memory modules, each having a plurality of addressable memory cells, and each having a plurality of signal registers;
  storing in a register in each memory module a digital signal representing the memory capacity of each said memory module;
  registering an ending address in the first module in accordance with the memory capacity of said first module, said first module having a beginning address,
  registering the beginning address of each said module but said first module in accordance with the sum of the memory capacities of the prior modules in the series and the beginning address of said first module by electrically combining the digital signals of said prior modules;
  registering the ending address of each said module but said first by electrically combining the beginning address of said latter module with the memory capacity signal stored therein;
  presenting a selected memory cell address signal to all modules;
  comparing the selected address signal with the registered beginning address signals of each module to determine whether said desired memory cell address signal lies within the range of the beginning and ending addresses of each module; and
  granting access to a memory cell in a memory module only if said selected memory cell address signal lies within said range of said module.

35. In a digital computer having a processing unit and a system for selectively addressing individual memory cells of a memory bank composed of a series of memory modules, each having a separate memory unit, each memory unit of said series containing a number of such memory cells, for storing information in or for reading information out of each cell in accordance with a corresponding selectable absolute address signal generated by said processing unit to represent an absolute address, the combination of:
  starting address means for supplying a signal representing an initial starting address for said memory bank;
  each said memory module of said memory bank comprising:
    a lower address boundary limiting means for registering a digital signal defining the lower boundary address for said each module;
    an upper address boundary limiting means for registering a digital signal defining the upper boundary address for said each module; and
    a memory capacity signal source for supplying a digital signal representing the memory cell capacity of said each memory unit;
  means responsive to the initial starting address of said memory bank for registering a local starting address in the lower address boundary limiting means of the first memory module of said series;
  means controlled by the starting address signal registered in said first memory module of said series and the memory capacity signal supplied by the memory capacity signal source of said first memory module for determining and registering the upper address of said first memory module as an upper address digital signal in the upper address boundary means thereof whereby a first local address range is established for said first memory module;
  means for rendering the lower address boundary limiting means of each memory module but the first responsive to the upper address boundary means of the next preceding memory module of the series to determine and to register a lower address digital signal in the lower address boundary limiting means of said each memory module but the first; and
  means in each memory module but the first in the series responsive to the starting address signal registered in said each module and to the memory capacity signal supplied by the memory capacity signal source in said each module for determining and registering the upper address digital signal in said upper address boundary defining means in said each module;
  whereby a local address range is established for said each memory module but the first, the total address range for said series of modules being greater than the address range for any one module.

36. In a digital computer as defined in claim 35, the combination further comprising:
  means for presenting a desired absolute memory cell address signal to said memory modules for either writing information into a cell or reading information out of a cell; and
  means in the respective memory modules for granting access to a memory cell in each memory unit of said modules only if said desired memory cell address signal lies within the local address range of the memory module in which said memory cell address is located.

37. In a digital computer as defined in claim 36, the combination further comprising:

means for generating and storing a digital signal defining said total address range of said series of modules;

means for comparing said total address range signal with said desired memory cell address signal; and means for granting access to a memory cell in said series of modules only if said desired memory cell address signal lies within said total address range.

38. In a digital computer having a processing module and a system for selectively addressing individual memory cells of a plurality of memory units external to said processing module, each such memory unit containing a number of such memory cells for storing information in or for reading information out of each cell in accordance with a corresponding selectable absolute address signal generated by said processing module to represent an absolute address, the improvement wherein the processor module comprises:

a local memory capacity register for storing a capacity signal representing the local memory capacity in said processor module;

a starting address generator for generating a starting address signal corresponding to said memory capacity;

means for transmitting said starting address signal to at least one of said plurality of memory units for establishing a lower address boundary for said one memory unit;

means for receiving and storing an ending address signal from at least one of said plurality of memory units, said ending address signal being representative of the total memory capacity of said plurality of memory units;

means for comparing a selected absolute address signal generated by said processing module, with said starting address signal and with said total memory capacity signal; and means for granting access to memory cells in said plurality of memory units only when said selected absolute address represented by said selected absolute address signal is greater than said local memory capacity and less than said total memory capacity.

39. In a digital computer as defined in claim 38, the processor module further comprising:

a memory unit, and means for granting access to memory cells in said processor module memory unit only when said selected absolute address represented by said selected absolute address signal is less than said lower address boundary.

40. In a digital computer as defined in claim 38, said plurality of memory units being arranged as an ordered series of memory units, the first memory unit is said series having means for receiving said starting address signal, the last memory unit is said series having means for transmitting said ending address signal, and each memory unit in said series having means for establishing limiting address boundaries corresponding to the limiting address boundaries of the next following and next preceding memory units in said series.

41. In a digital computer having a processing module and a system for selectively addressing individual memory cells of at least one memory unit external to said processing module and containing a number of such memory cells for storing information in or for reading information out of each cell in accordance with a corresponding selectable absolute address signal generated by said processing module to represent an absolute address, the improvement wherein the processor module comprises:

a local memory capacity register for storing a capacity signal representing the local memory capacity in said processor module;

a starting address generator for generating a starting address signal corresponding to said memory capacity;

means for transmitting said starting address signal to said memory unit for establishing a lower address boundary for said memory unit;

means for receiving and storing an ending address signal from said memory unit, said ending address signal being representative of the total memory capacity of said memory unit;

means for comparing a selected absolute address signal generated by said processing module, with said starting address signal and with said total memory capacity signal; and means for granting access to said memory cells only when said selected absolute address represented by said selected absolute signal is greater than said local memory capacity and less than said total memory capacity.

42. In a digital computer as defined in claim 41, the processor module further comprising:

a memory unit, and means for granting access to memory cells in said processor module memory unit only when said selected absolute address represented by said selected absolute address signal is less than said lower address boundary.

43. In a digital computer as defined in claim 41, said external memory unit having means for receiving said starting address signal, and means for transmitting said ending address signal to said processor module.

* * * * *